US008942547B2

(12) United States Patent
Maruyama et al.

(10) Patent No.: US 8,942,547 B2
(45) Date of Patent: Jan. 27, 2015

(54) VIDEO SIGNAL CONVERTING APPARATUS AND VIDEO SIGNAL CONVERTING METHOD

(71) Applicant: Panasonic Corporation, Osaka (JP)

(72) Inventors: Yuki Maruyama, Osaka (JP); Kazuhito Kimura, Shiga (JP)

(73) Assignee: Panasonic Corporation, Osaka (JP)

( * ) Notice: Subject to any disclaimer, the term of this patent is extended or adjusted under 35 U.S.C. 154(b) by 130 days.

(21) Appl. No.: 13/732,669

(22) Filed: Jan. 2, 2013

(65) Prior Publication Data
US 2013/0121667 A1 May 16, 2013

Related U.S. Application Data

(63) Continuation of application No. PCT/JP2011/003781, filed on Jul. 1, 2011.

(30) Foreign Application Priority Data

Jul. 2, 2010 (JP) ................................. 2010-151775

(51) Int. Cl.
H04N 5/92 (2006.01)
H04N 5/78 (2006.01)
(Continued)

(52) U.S. Cl.
CPC ........... *H04N 9/7921* (2013.01); *H04N 5/7755* (2013.01); *H04N 9/8042* (2013.01);
(Continued)

(58) Field of Classification Search
USPC .......... 348/42, 43, 44, 51; 386/314, 326, 335, 386/353
See application file for complete search history.

(56) References Cited

U.S. PATENT DOCUMENTS 7,856,181 B2 12/2010 Maezono
8,149,267 B2* 4/2012 Sasaki et al. .................... 348/42
(Continued)

FOREIGN PATENT DOCUMENTS

JP 6-113334 4/1994
JP 9-6557 1/1997
(Continued)

OTHER PUBLICATIONS

International Preliminary Report on Patentability issued Feb. 21, 2013 in International (PCT) Application No. PCT/JP2011/003781.
(Continued)

*Primary Examiner* — Daquan Zhao
(74) *Attorney, Agent, or Firm* — Wenderoth, Lind & Ponack, LLP

(57) ABSTRACT

The recorder apparatus includes the controller that sets conversion mode used when input stream is processed and converted into recording stream to any of two-dimensional mode that converts the input stream into two-dimensional recording stream and three-dimensional mode that converts the input stream into three-dimensional recording stream, the controller that sets one recording mode that can be used when the video signal is converted and processed in the two-dimensional mode and the three-dimensional mode and specifies recording rate, and the signal processor that processes the video signal based on the set conversion mode and the set recording mode to convert the video signal into recording video signal. The controller sets the recording modes such that combination of the recording modes that can be set when the two-dimensional mode is set is different from combination of recording modes that can be set when the three-dimensional mode is set.

14 Claims, 17 Drawing Sheets (a) TIMER RECORDING SCREEN IN 2D MODE (b) TIMER RECORDING SCREEN IN 3D MODE (c) TIMER RECORDING SCREEN IN 3D MODE

M1

(51) Int. Cl.

| | | |
|---|---|---|
| *H04N 5/89* | (2006.01) | |
| *H04N 5/93* | (2006.01) | |
| *H04N 9/79* | (2006.01) | |
| *H04N 5/775* | (2006.01) | |
| *H04N 9/804* | (2006.01) | |
| *H04N 21/4147* | (2011.01) | |
| *H04N 21/433* | (2011.01) | |
| *H04N 21/482* | (2011.01) | |
| *H04N 21/485* | (2011.01) | |
| *H04N 21/81* | (2011.01) | |
| *H04N 13/00* | (2006.01) | |
| *H04N 13/04* | (2006.01) | |

(52) U.S. Cl.
CPC ....... *H04N13/0048* (2013.01); *H04N 13/0055* (2013.01); *H04N 13/0452* (2013.01); *H04N 21/4147* (2013.01); *H04N 21/4334* (2013.01); *H04N 21/4821* (2013.01); *H04N 21/485* (2013.01); *H04N 21/816* (2013.01)
USPC ........... 386/326; 386/314; 386/335; 386/353; 348/42; 348/43; 348/44; 348/51

(56) References Cited

U.S. PATENT DOCUMENTS

| | | | |
|---|---|---|---|
| 8,400,524 B2 * | 3/2013 | Okamoto et al. | .......... 348/231.2 |
| 8,610,763 B2 * | 12/2013 | Ota et al. | .......... 348/54 |
| 8,712,212 B2 * | 4/2014 | Miyata et al. | .......... 386/239 |
| 2009/0123144 A1 | 5/2009 | Maezono | |
| 2011/0013888 A1 * | 1/2011 | Sasaki et al. | .......... 386/353 |
| 2011/0122224 A1 | 5/2011 | Lou | |
| 2012/0051718 A1 * | 3/2012 | Miura et al. | .......... 386/248 |

FOREIGN PATENT DOCUMENTS

| | | |
|---|---|---|
| JP | 2001-346028 | 12/2001 |
| JP | 2008-17043 | 1/2008 |
| JP | 2009-38791 | 2/2009 |
| JP | 2009-48181 | 3/2009 |
| JP | 2010-41123 | 2/2010 |
| JP | 2011-109671 | 6/2011 |

OTHER PUBLICATIONS

International Search Report issued Sep. 27, 2011 in International (PCT) Application No. PCT/JP2011/003781.

\* cited by examiner

Fig. 8
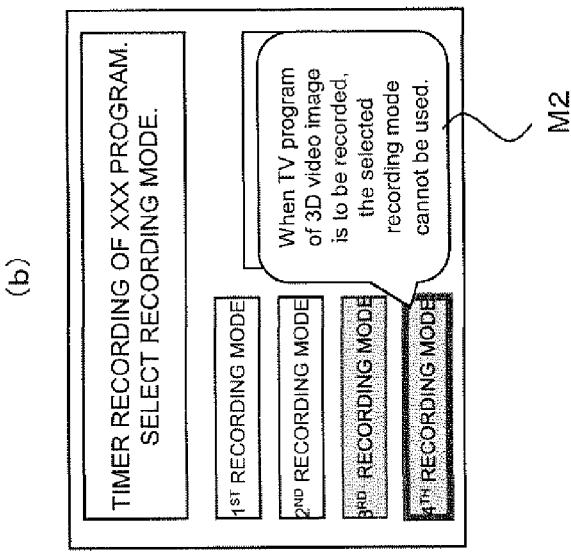
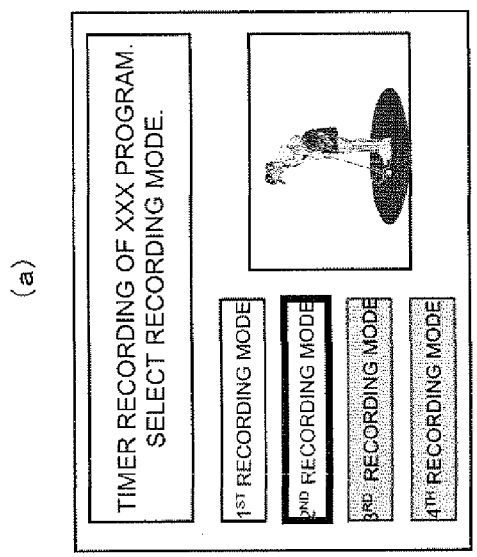

M3

Fig. 15
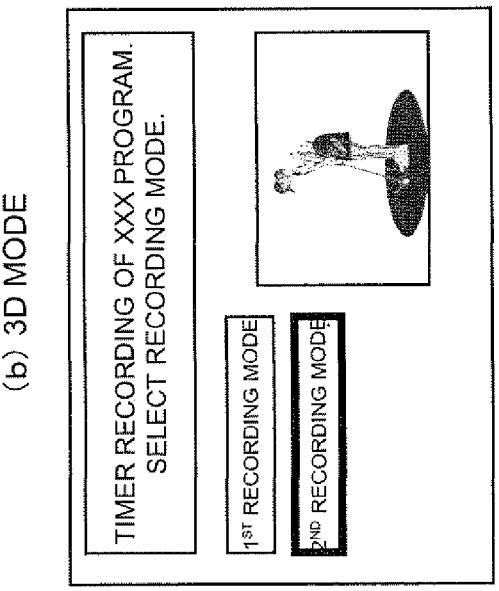
(b) 3D MODE
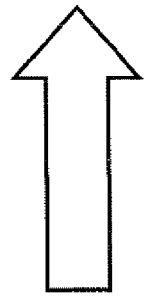
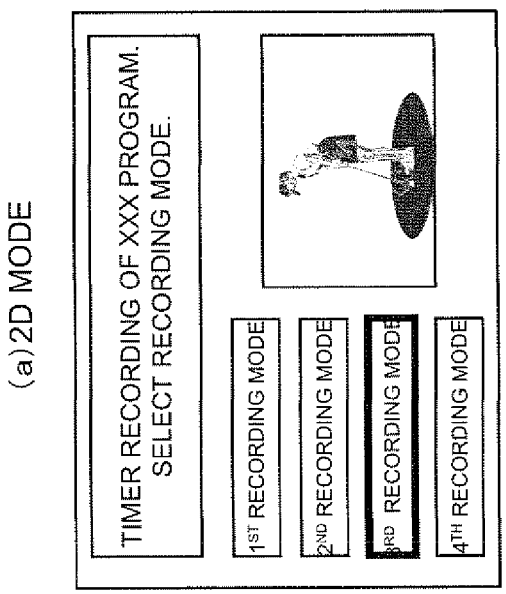
(a) 2D MODE

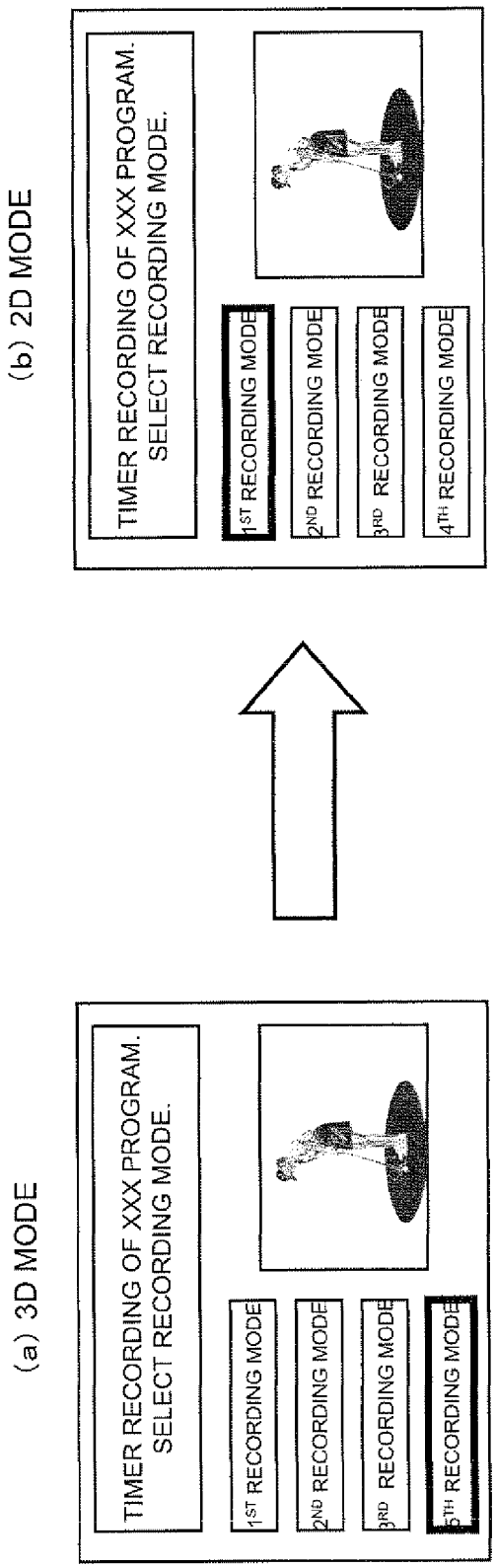

VIDEO SIGNAL CONVERTING APPARATUS AND VIDEO SIGNAL CONVERTING METHOD

CROSS REFERENCE TO RELATED APPLICATIONS

This is a continuation application of PCT Application. No. PCT/JP2011/003781, filed Jul. 1, 2011, designating the United States of America, which claims the priority of Japanese Patent Application No. 2010-151775, filed Jul. 2, 2010, the disclosure of which, including the specifications, drawings, and claims, are incorporated herein by reference in their entireties.

TECHNICAL FIELD

The present invention relates to a video signal converting apparatus and a video signal converting method that convert an input stream into a 3D video image or a 2D video image to record the 3D video image or the 2D video image on a recording medium such as an optical disk, a magnetic disk, or a flash memory.

BACKGROUND ART

As schemes that encode 3D video images, various schemes are proposed. In this case, the 3D video image is a video image generated by a video signal configured by a video signal of a first view point (to be referred to as a first-view-point video signal hereinafter) and a video signal of the second view point (to be referred to as a second-view-point video signal hereinafter). One of the first-view-point video signal and the second-view-point video signal is a video signal for a right eye, and the other is a video signal for a left eye. A video signal configured by only a video signal of a first view point is called a 2D video image.

As a scheme for encoding a 3D video image, for example, a scheme in which a first-view-point video signal is encoded with the same scheme as that for a 2D video image and a second-view-point video signal is subjected to motion compensation by using a picture of a first-view-point video signal simultaneous with the second-view-point video signal as a reference picture is proposed (to be referred to as a disparity compensation scheme hereinafter) is proposed. In comparison with the encoding for a 2D video image, the scheme can advantageously encode a 3D video image without decreasing the resolutions of a first-view-point video signal and a second-view-point video signal.

As another example of the scheme for encoding a 3D video image, a scheme that horizontally reduces a first-view-point video signal and a second-view-point video signal into halves, respectively, arranges the reduced video signals from side to side, and encodes the video signals by the same scheme as that for a 2D video image is proposed. In this case, information representing that an encoding stream is a 3D video image is added to the header information of the encoding stream to discriminate a 2D video image encoding stream from a 3D video image encoding stream.

Patent Document 1 of a conventional technique describes an encoding apparatus that calculates quantized values such that a quantized value of an image (large parallax) on a front side is reduced and a quantized value of an image (small parallax) on a rear side is increased.

PRIOR ART DOCUMENT

Patent Document

Patent Document 1: JP H06-113334 A

DISCLOSURE OF INVENTION

Problem to be Solved by the Invention

When a video image is quantized, encoding distortion such as block noise or mosquito noise occurs depending on quantized values (for example, recording rates). When a 3D video image is quantized, encoding distortions such as block noise or mosquito noise appear in different manners in the left and right images, respectively. When video images sensed with left and right eyes are largely different from each other, a user cannot easily recognize the video image as a 3D video image when the user views the video image.

The present invention has been made to solve the above problem and has as its object to provide a video signal converting apparatus that can present a video image that can be preferably recognized by a user regardless of video formats.

Means for Solving the Problem

A video signal converting apparatus in accordance with the invention comprises: a conversion mode setting unit that sets a conversion mode used when a video signal is processed and converted into a recording video signal to any one of a two-dimensional mode that converts the video signal into a two-dimensional recording video signal and a three-dimensional mode that converts the video signal into a three-dimensional recording video signal; a recording mode setting unit that sets at least one recording mode that can be used when the video signal is converted in each of the two-dimensional mode and the three-dimensional mode and that specifies a recording rate; and a converting unit that processes the video signal and converts the processed video signal into a recording video signal based on the set conversion mode and the set recording mode. Therein, the recording mode setting unit sets a recording mode such that a combination of recording modes that can be set when the conversion mode setting unit sets the two-dimensional mode is different from a combination of recording modes that can be set when the conversion mode setting unit sets the three-dimensional mode.

In this manner, the video signal converting apparatus can present recording modes having different combinations to a user when a three-dimensional mode is set and when a two-dimensional mode is set. In this manner, when a converting operation of a video signal is set, recording modes matched with the video characteristics of a 2D video image and a 3D video image can be set, respectively. In a 3D video image, in comparison with a 2D video image, when a user visually recognizes a video image, an encoding distortion such as block noise or mosquito noise more adversely affects image quality. When the recording modes that can be used in recording of a 3D video image and recording of a 2D video image are made different from each other, while various recording modes can be used in the recording of the 2D video image, a recording mode at a low recording mode in which block noise or the like easily occurs can be prohibited from being used in the recording of the 3D video image. In this manner, a poor-image-quality 3D video image can be prevented from being recorded while keeping user's convenience in recording of a 2D video image. Thus, a video signal converting apparatus that can present a video image that can be preferably visually recognized by a user regardless of video formats can be provided.

Additionally, preferably, the recording mode setting unit prohibits a setting of at least a recording mode having the lowest recording rate of the recording modes that can be set in the two-dimensional mode in the three-dimensional mode.

In this manner, when a three-dimensional mode is set, a user cannot select at least a recording mode having the lowest recording rate from recording modes that can be selected in a two-dimensional mode. In this manner, influences of encoding distortions such as block noise and mosquito noise can be reliably reduced when a user visually recognizes a video image. Thus, even though a user sets any one of the recording modes that can be selected in the three-dimensional mode, the minimum image quality of a recording video signal can be assured.

Additionally, preferably, the video signal converting apparatus further comprising a storage unit that records information representing the recording mode previously set by the recording mode setting unit. Therein, the recording mode setting unit has an operation mode that tries to set a recording mode set when the conversion unit performs a converting process based on the information stored at least in the storage unit, and in the operation mode, when a recording mode represented by the information stored in the storage unit is a recording mode that cannot be set in the two-dimensional mode or the three-dimensional mode set by the conversion mode setting unit, sets another recording mode in place of the recording mode represented by the information stored in the storage unit.

In this manner, the previously set recording mode can be stored. A recording mode can be set by using the recorded recording mode. Even though the previous recording mode cannot be set in the two-dimensional mode or the three-dimensional mode that is currently set, another recording mode can be set in place of the previous recording mode. In this manner, the operationality of a user can be improved.

Additionally, preferably, the recording mode setting unit sets, as the another recording mode, any one of the recording modes that can be set in the two-dimensional mode or the three-dimensional mode set by the conversion mode setting unit.

In this manner, when the video signal converting apparatus sets the two-dimensional mode or the three-dimensional mode, the video signal converting apparatus can automatically set a recording mode that can be set in the currently set two-dimensional mode or the currently set three-dimensional mode. Accordingly, the user can always start or set an operation in a recording mode that can be set in a current mode.

Additionally, preferably, the recording mode setting unit sets, as the another recording mode, a recording mode having the lowest recording rate of the recording modes that can be set in the two-dimensional mode or the three-dimensional mode set by the conversion mode setting unit.

In this manner, when the two-dimensional mode or the three-dimensional mode is set, a recording mode having the lowest recording rate of the recording modes that can be set in the set two-dimensional mode or the set three-dimensional mode can be automatically set. Accordingly, the user can always start or set an operation in the recording mode having the lowest recording rate of the recording modes that can be set in the set two-dimensional mode or the set three-dimensional mode.

Additionally, preferably, the recording mode setting unit sets, as the another recording mode, a recording mode having the highest recording rate of the recording modes that can be set in the two-dimensional mode or the three-dimensional mode set by the conversion mode setting unit.

In this manner, when the two-dimensional mode or the three-dimensional mode is set, a recording mode having the highest recording rate of the recording modes that can be set in the set two-dimensional mode or the set three-dimensional mode can be automatically set. Accordingly, the user can always start or set an operation in the recording mode having the highest recording rate of the recording modes that can be set in the set two-dimensional mode or the set three-dimensional mode.

Additionally, preferably, the video signal converting apparatus further comprises a storage unit that stores information representing a recording mode previously set by the recording mode setting unit in the two-dimensional mode and information representing a recording mode previously set by the recording mode setting unit in the three-dimensional mode.

In this manner, information representing the recording modes that are previously set in the two-dimensional mode and the three-dimensional mode can be stored. Accordingly, a resume function in the two-dimensional mode and a resume function in the three-dimensional mode can be independently realized.

Additionally, preferably, the recording mode setting unit has an operation mode that tries to set a recording mode set when the conversion unit performs a converting process based on the information stored at least in the storage unit.

In this manner, the previously set recording mode can be set in the current two-dimensional mode and the current three-dimensional mode. Accordingly, a resume function in the two-dimensional mode and a resume function in the three-dimensional mode can be independently realized.

Additionally, preferably, the video signal converting apparatus further comprises: a storage unit that stores information representing a recording mode previously set by the recording mode setting unit; and a screen generating unit that generates a selection screen used to select a recording mode set by the recording mode setting unit. Therein, the screen generating unit highlights any one of the recording modes that can be set by the recording mode setting unit in the two-dimensional mode or the three-dimensional mode set at the present based on the information stored in the storage unit.

In this manner, based on the recording mode stored in a storage unit, a screen on which any one of the recording modes that can be set in the currently set two-dimensional mode or the currently set three-dimensional mode is highlighted can be shown to the user. In this manner, the operationality of the user can be improved.

Additionally, preferably, the video signal converting apparatus further comprises a screen generating unit that generates a selection screen used to select a recording mode set by the recording mode setting unit. Therein, the screen generating unit, when the conversion mode setting unit sets the three-dimensional mode, generates a selection screen added with information representing that recording modes that can be set by the recording mode setting unit are limited in comparison with a case in which the conversion mode setting unit sets the two-dimensional mode.

In this manner, when the three-dimensional mode is set, the user can be caused to visually recognize that some recording modes of the recording modes that can be set in the two-dimensional mode are limited. Accordingly, even though the three-dimensional mode is set, the user can reduce her/his uncomfortable feeling to an operation of the video signal converting apparatus.

Additionally, preferably, the information representing that the recording modes that can be set by the recording mode setting unit are limited includes information representing that, of the recording modes that can be set by the recording mode setting unit when the conversion mode setting unit sets the two-dimensional mode, a recording mode having a low recording rate is prohibited.

In this manner, when the three-dimensional mode is set, the user can be caused to visually recognize that a recording mode having a low recording rate of the recording modes that can be set in the two-dimensional mode is limited. Accordingly, when the three-dimensional mode is set to limit selectable recording modes, the frequency of causing a user to erroneously understand that the recording modes not are limited can be reduced.

Additionally, preferably, the video signal converting apparatus further comprises a screen generating unit that generates a selection screen used to select a recording mode set by the recording mode setting unit. Therein, the screen generating unit, when the conversion mode setting unit sets the three-dimensional mode, generates a selection screen added with information that recommends a recording mode having a high recording rate of the recording modes that can be set by the recording mode setting unit.

In this manner, when the three-dimensional mode is set, the recording mode having the highest recording rate can be recommended for the user. For this reason, the probability of selection of the recording mode having the highest recording rate by the user can be increased.

Additionally, preferably, the video signal converting apparatus further comprises a screen generating unit that generates a selection screen used to select a recording mode set by the recording mode setting unit. Therein, the screen generating unit, when the conversion mode setting unit sets the three-dimensional mode, generates a selection screen added with information representing that recording modes that can be set by the recording mode setting unit are limited when the conversion mode setting unit sets the two-dimensional mode.

In this manner, when the three-dimensional mode is set, the user can be caused to visually recognize that some recording modes of the recording modes that can be set in the two-dimensional mode are limited. Accordingly, even though the three-dimensional mode is set, the user can reduce her/his uncomfortable feeling to an operation of the video signal converting apparatus.

Effect of the Invention

According to the video signal converting apparatus of the present invention, when an input stream converting operation is set, recording modes matched with the video characteristics of a 2D video image and a 3D video, respectively, image can be selected. Typically, in a 3D video image, in comparison with a 2D video image, when a user visually recognizes a video image, an encoding distortion such as block noise or mosquito noise more adversely affects image quality. When the recording modes that can be used in recording of a 3D video image and recording of a 2D video image are made different from each other, while various recording modes can be used in the recording of the 2D video image, a recording mode at a low recording mode in which block noise or the like easily occurs can be prohibited from being used in the recording of the 3D video image. In this manner, a poor-image-quality 3D video image can be prevented from being recorded while keeping user's convenience in recording of a 2D video image. Thus, a video signal converting apparatus capable of presenting a video image that can be preferably visually recognized by a user regardless of video formats can be provided.

BRIEF DESCRIPTION OF DRAWINGS

FIG. 8 is a diagram showing a timer recording screen on which a warning message in Embodiment 1 is displayed.

FIG. 15 is a diagram showing an example of cursor movement in Embodiment 2.

FIG. 17 is a diagram showing an example of cursor movement in Embodiment 2.

MODES FOR CARRYING OUT THE INVENTION

Embodiment 1

1-1. Recorder Apparatus and Peripheral Apparatus Therefor

A recorder apparatus 1 according to Embodiment 1 will be described below with reference to the accompanying drawings.

Figure 1:
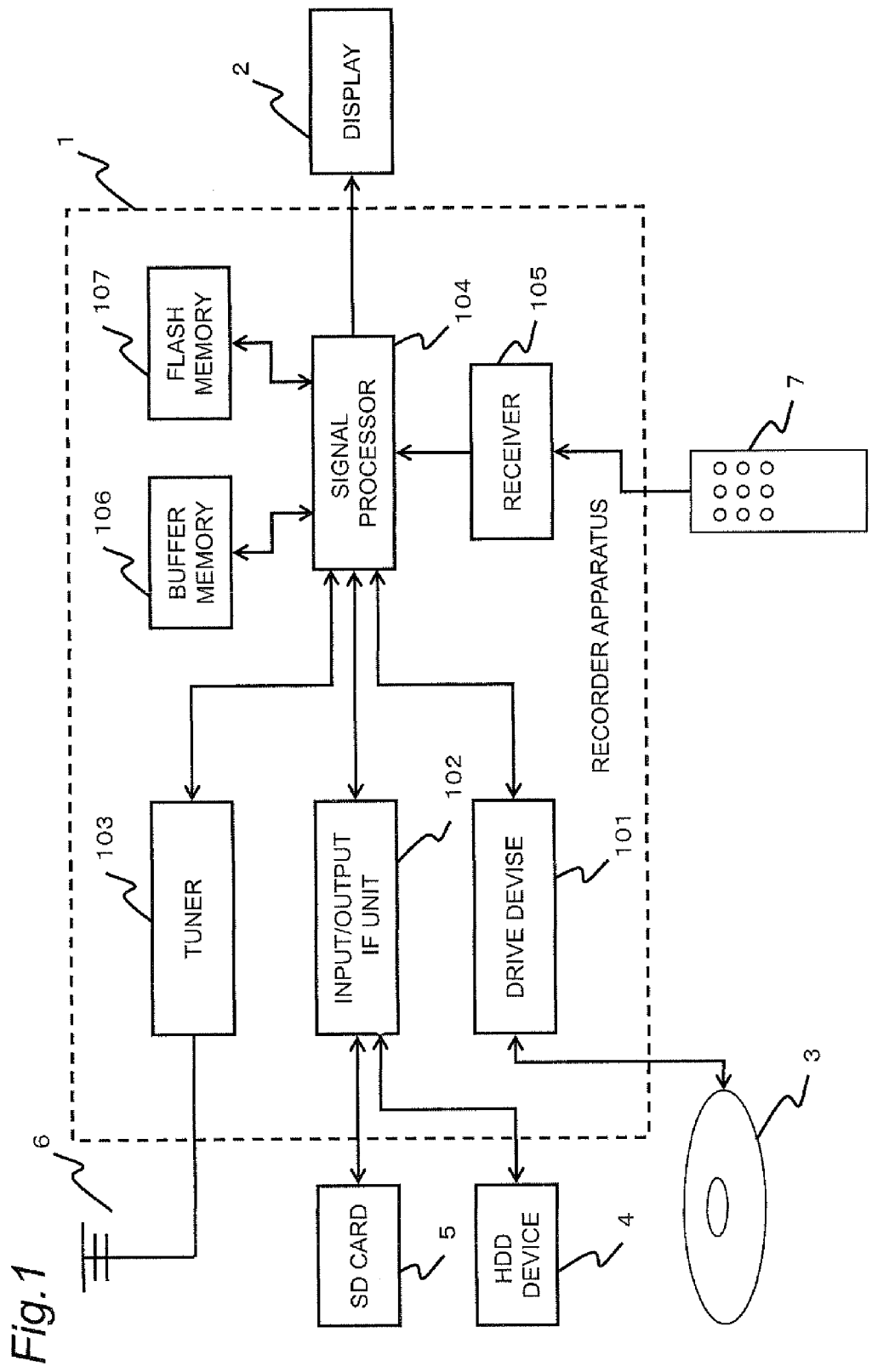
FIG. 1 is a diagram showing an entire configuration of a recorder apparatus 1 according to the embodiment.

FIG. 1 is a diagram showing an entire configuration of the recorder apparatus 1. As shown in FIG. 1, the recorder apparatus 1 is connected to a display 2, an HDD (hard disk drive) device 4, an SD card (secure digital card) 5, and an antenna 6. The recorder apparatus 1 receives various video signals (input stream, broadcast wave, and the like) output from a BD disk (Blue-ray Disc: registered trademark) 3, the HDD device 4, the SD card 5, and the antenna 6. These signals are processed to display a video image on the display 2.

The recorder apparatus 1 receives a signal output from a remote-controller 7.

The display 2 displays a display screen based on a display signal input from the signal processor 104. The display 2 can be realized with, for example, a liquid-crystal display. As the display 2, a display device that can display a 3D video image based on a three-dimensional video signal is preferably used.

The HDD device 4 is a recording device that stores a video signal. The HDD device 4 can be realized with, for example, an external hard disk drive device.

The SD card 5 is a recording medium that stores a video signal. The SD card 5 can be realized with a semiconductor recording element such as an SD card or a memory card.

The antenna 6 has a function of receiving a video signal transmitted from the outside.

The remote-controller 7 is an operation device that accepts an operation from a user. The remote-controller 7 has a plurality of buttons that can be depressed. A user operates the buttons to cause the remote-controller 7 to generate a signal. The remote-controller 7 wirelessly transmits the generated signal to the recorder apparatus 1. In this manner, the recorder apparatus 1 detects an operation of the user.

1-2. Recorder Apparatus

A concrete configuration of the recorder apparatus 1 will be described below with reference to the accompanying drawings.

The recorder apparatus 1, as shown in FIG. 1, includes a drive device 101, an input/output interface unit 102 (to be referred to as an "input/output" IF unit 102 hereinafter), a tuner 103, the signal processor 104, a receiver 105, a buffer memory 106, and a flash memory 107.

The drive device 101 includes a disk tray to read a video signal from a BD disk 3 loaded with the disk tray. When the drive device 101 receives the video signal from the signal processor 104, the drive device 101 writes the video signal on the ED disk 3 loaded on the disk tray.

The input/output IF unit 102 is an interface that makes it possible to connect the HDD device 4 and the SD card 5 to each other. The input/output IF unit 102 exchanges a control signal and a video signal (input stream, encoding stream, uncompressed video stream, or the like) between the HDD device 4 and the signal processor 104 and between the SD card 5 and the signal processor 104. The input/output IF unit 102 transmits the input stream input from the HDD device 4 or the SD card 5 to the signal processor 104. The input/output IF unit 102 transmits the encoding stream or the uncompressed video stream that are input from, the signal processor 104 to the HDD device 4 or the SD card 5. For example, the input/output IF unit 102 can be realized by an HEW connector, an SD card slot, a USE connector, or the like. In FIG. 1, although one block is shown as the input/output IF 102, a card slot for the SD card 5 and a connector for the HDD 4 may be arranged. In short, the input/output IF unit 102 may realize an interface with an external recording device.

The tuner 103 receives a broadcast wave through the antenna 6. The tuner 103 demodulates a broadcast wave having a specific frequency designated by the signal processor 104 to output a generated input stream to the signal processor 104. In this manner, the signal processor 104 processes a video signal having the specific frequency included in the broadcast wave to make it possible to display a video image on the display 2.

The signal processor 104 controls the components of the recorder apparatus 1. Furthermore, the signal processor 104 has a decoding function and an encoding function for the video signal output from the input/output IF unit 102. The signal processor 104, for example, encodes an input stream by using H.264/AVC encoding standard to record the input stream as a recording stream. The signal processor 104 has a function of outputting the input stream as an uncompressed recording stream without encoding the input stream. The signal processor 104 has a function of converting the input stream into a recording stream.

The signal processor 104 has a function of setting a conversion mode that converts an input stream as a 2D video image (to be referred to as a two-dimensional mode hereinafter) and a conversion mode that converts the input stream as a 3D video image (to be referred to as a three-dimensional mode hereinafter). The signal processor 104 may be configured such that any one of the two-dimensional mode and the three-dimensional mode is set based on a signal from the remote-controller 7. The signal processor 104 may be configured such that any one of the two-dimensional mode and the three-dimensional mode is set based on meta information of the input stream.

Furthermore, the signal processor 104 controls a recording mode when the input stream is recorded on the BD disk 3, the HDD device 4, or the SD card 5. The recording mode is a recording rate targeted when the input stream is converted into the recording stream. In this case, when the signal processor 104 outputs a recording stream, the input stream may be output as a recording stream without being changed, or the input stream may be re-encoded and output. When the input stream is output as the recording mode without being changed, a recording rate is equal to a bit rate of the input stream (for example, 24 Mbps or the like). When the input stream is re-encoded and output, the recording rate is lower than the bit rate of the input stream.

The signal processor 104 includes a plurality of recording modes that can be set in the two-dimensional mode. The signal processor 104 includes a plurality of recording modes that can be set in the three-dimensional mode. A combination of the recording modes that can be set in the two-dimensional mode is different from a combination of the recording modes that can be set in the three-dimensional mode. For example, when the recording modes that can be set in the two-dimensional mode are 16 Mbps, 8 Mbps, 3 Mbps, and 1 Mbps, respectively, the recording modes that can be set in the three-dimensional mode are 16 Mbps and 8 Mbps, respectively.

More specifically, the signal processor 104 can set 3 Mbps and 1 Mbps in the two-dimensional mode. However, the signal processor 104 cannot set these modes in the three-dimensional mode. More specifically, the signal processor 104 cannot set a low recording rate of the recording rates that can be set in the two-dimensional mode in the three-dimensional mode.

The recording modes that can be set in the three-dimensional mode need not be always settable even in the two-dimensional mode. For example, in the two-dimensional mode, 16 Mbps, 8 Mbps, 3 Mbps, and 1 Mbps are made settable. On the other hand, in the three-dimensional mode, 16 Mbps, 12 Mbps, and 8 Mbps may be settable.

In this manner, the combination of the recording rates that can be set in the two-dimensional mode and the combination of the recording rates that can be set in the three-dimensional mode are made different from each other to make it possible to easily set recording rates suitable for the two-dimensional mode and the three-dimensional mode, respectively. For example, as described above, since a low recording rate is prohibited from being set in the three-dimensional mode, when a user views a video image shown by a recording stream in the three-dimensional mode, the user does not easily feel distortion of the video image.

The signal processor 104 may configure a recording mode such that an average value of a recording rate in a recording mode that can be set in the three-dimensional mode is higher than an average value of a recording rate in a recording mode that can be selected in the two-dimensional mode.

Furthermore, the signal processor 104 performs various pieces of video image processing to an input stream and outputs a display signal that can be displayed on the display 2 to the display 2. The signal processor 104 generates an operation screen of the recorder apparatus 1 to output the operation screen to the display 2.

The signal processor 104 may be configured by a microcomputer or a hard-wired circuit.

The receiver 105 receives a signal from the remote-controller 7 to transmit the signal to the signal processor 104. The receiver 105 can be, for example, an infrared sensor.

The buffer memory 106 is used as a work memory used when signal processing is performed by the input/output IF unit 102. The tuner 103 can be realized by, for example, a DRAM.

The flash memory 107 stores a program and the like executed by the recorder apparatus 104. The flash memory 107 holds a recording mode previously set by the signal processor 1. The flash memory 107 stores the recording mode previously set in the two-dimensional mode and the recording mode previously selected when the three-dimensional mode was set.

1-2-1. Signal Processor

A concrete configuration of the signal processor 104 will be described below with reference to the accompanying drawings. For the sake of descriptive convenience, in the signal processor 104, a configuration that sets a two-dimensional mode or a three-dimensional mode as a conversion mode based on a video format of an input stream will be described below. More specifically, the signal processor 104 sets the three-dimensional mode when the input stream is a 3D video image. Furthermore, the signal processor 104 sets the two-dimensional mode when the input stream is a 2D video image.

Figure 2:
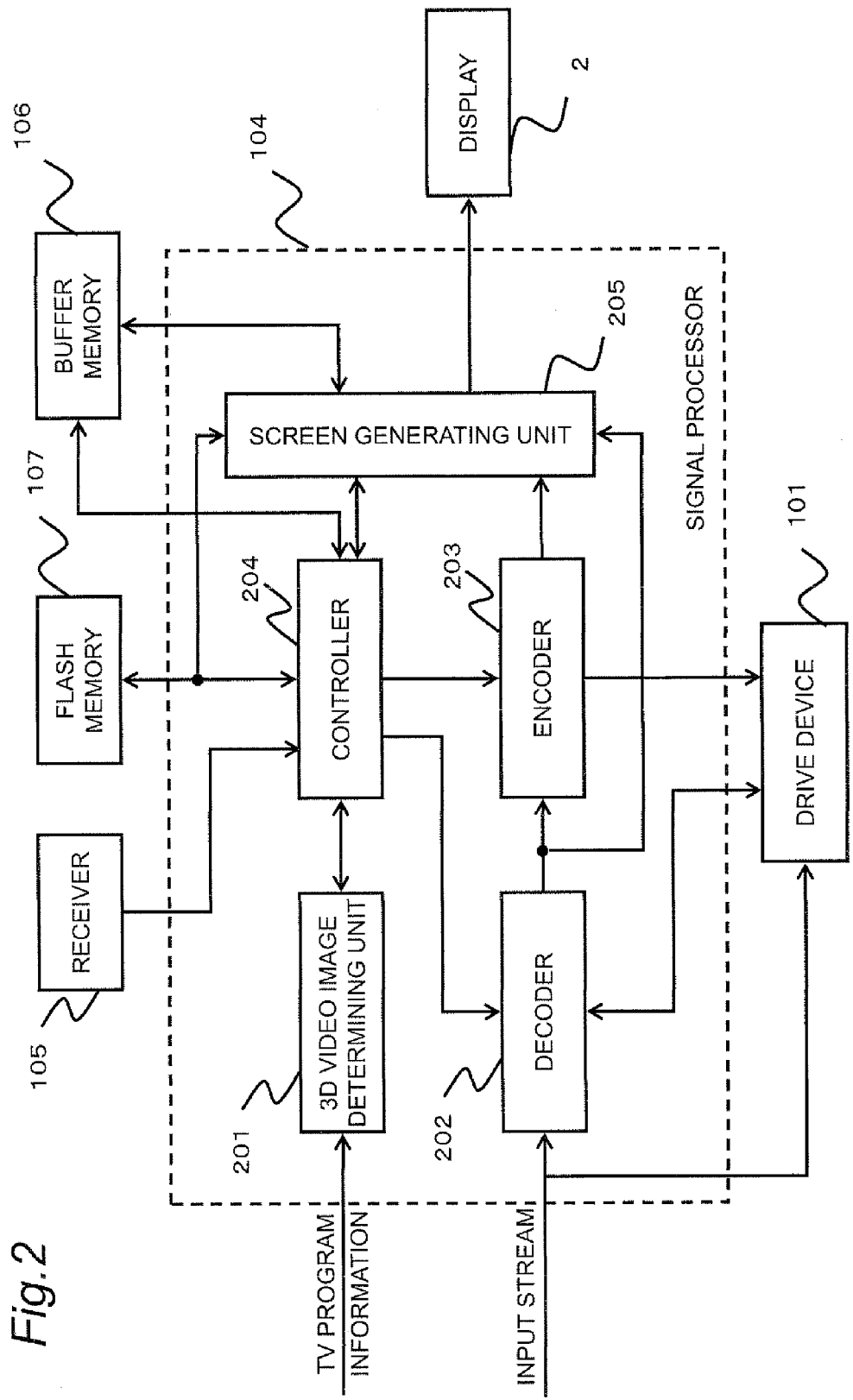
FIG. 2 is a diagram showing a configuration of a signal processor 104 according to the embodiment.

FIG. 2 is a diagram showing the configuration of the signal processor 104 according to the embodiment;

As shown in FIG. 2, the signal processor 104 includes a 3D video image determining unit 201, a decoder 202, an encoder 203, a controller 204, and a screen generating unit 205. FIG. 2 shows an example in which an input stream from the tuner 103 is processed for the sake of descriptive convenience. Thus, a signal input to the 3D video image determining unit 201 or the decoder 202 is a signal that is received and demodulated by the tuner 103. In this case, the signal input to the 3D video image determining unit 201 or the decoder 202 may be a signal output from the input/output IF unit 102 or the drive device 101.

The 3D video image determining unit 201 has a function of determining whether the input stream is a 3D video image or a 2D video image. The 3D video image determining unit 201 reports a determination result to the controller 204. A concrete determining method in the 3D video image determining unit 201 will be described later.

The decoder 202 decodes the input stream based on control information of the controller 204 to generate a decoded video signal. For example, when the control information representing the two-dimensional mode is reported by the controller 204, the decoder 202 decodes the input stream in the two-dimensional mode to output a two-dimensional decoded video signal. When the control information representing the three-dimensional mode is reported by the controller 204, the decoder 202 decodes the input stream in the three-dimensional mode to output a three-dimensional decoded video signal. The decoder 202 may decode an input stream input from the drive device 101 to generate a decoded video signal. The decoder 202 outputs the decoded video signal to the encoder 203 and the screen generating unit 205.

The encoder 203 compresses and encodes the decoded video signal generated by the decoder based on the control information of the controller 204. For example, when the control information representing the two-dimensional mode is reported by the controller 204, the encoder 203 encodes the input stream as a 2D video image. When the control information representing the three-dimensional mode is reported by the controller 204, the encoder 203 encodes the input stream as a 3D video image. In this case, the encoder 203 performs encoding in a recording mode represented by the control information reported by the controller 204. The encoder 203 outputs an encoded video image obtained by the encoding to the drive device 101 and the screen generating unit 205.

The controller 204 controls an entire operation of the signal processor 104. The controller 204 sets the conversion mode to the two-dimensional mode or the three-dimensional mode based on a report from the 3D video image determining unit 201. For example, when the controller 204 is reported by the 3D video image determining unit 201 that the input stream is a 2D video image, the controller 204 sets the conversion mode to the two-dimensional mode. For example, when the controller 204 is reported by the 3D video image determining unit 201 that the input stream is a 3D video image, the controller 204 sets the conversion mode to the three-dimensional mode. When the conversion mode is set, the controller 204 reports control information representing the set conversion mode to the decoder 202 and the encoder 203. When the controller 204 is designated by the receiver 105 to set the two-dimensional mode or the three-dimensional mode, the controller 204 sets the conversion mode according to the designation.

When the controller 204 is designated to set the two-dimensional mode, the controller 204 sets a recording mode that can be selected by a user in the two-dimensional mode. For example, the controller 204 sets a recording mode having a recording rate of 16 Mbps, 8 Mbps, 3 Mbps, or 1 Mbps as the recording mode that can be selected by a user in the two-dimensional mode. When the controller 204 is designated to set the three-dimensional mode, the controller 204 sets a recording mode that can be selected by a user in the three-dimensional mode. For example, the controller 204 sets a recording mode having a recording rate of 16 Mbps or 12 Mbps as the recording mode that can be selected in the three-dimensional mode.

The controller 204 outputs a signal related to the recording mode in conversion of an input stream to the encoder 203 based on a signal input from the remote-controller 7 through the receiver 105. For example, a case in which the three-dimensional mode is set and the recording mode having a recording rate of 16 Mbps is to a selective state will be considered. In this case, when the signal from the remote-controller 7 is received through the receiver 105, the controller 204 outputs a signal related to the recording mode in the selective state to the encoder 203. It is assumed that the controller 204 sets the recording mode having the recording rate of 16 Mbps as a recording mode that can be set in the three-dimensional mode. In this case, the controller 204 can set the recording modes except for the recording mode having the recording rate of 16 Mbps to a selective state, but cannot set the recording modes. The selective state of the recording mode mentioned here means a state in which a user selects a specific recording mode. The setting of the recording mode means that the controller 204 sets a specific recording mode in the subsequent operations.

The controller 204 outputs a signal related to a recording mode in a selective state to the screen generating unit 205.

The screen generating unit 205 generates a screen displayed on the display 2 based on control information from the controller 204. The screen generating unit 205 sets a recording mode to a selective state on the generated screen based on the control information from the controller 204. Furthermore, the screen generating unit 205 sets the recording mode to a selective state on the generated screen by using the previously selected recording mode stored in the flash memory 107.

1-3. Operation of Signal Processor

A recording operation of an input stream performed by the signal processor 104 will be described below with reference to the accompanying drawings. For the sake of descriptive convenience, it is assumed that the signal processor 104 receives a broadcast wave through the tuner 103, processes the broadcast wave, and records the processed broadcast wave on the BD disk 3.

Figure 3:
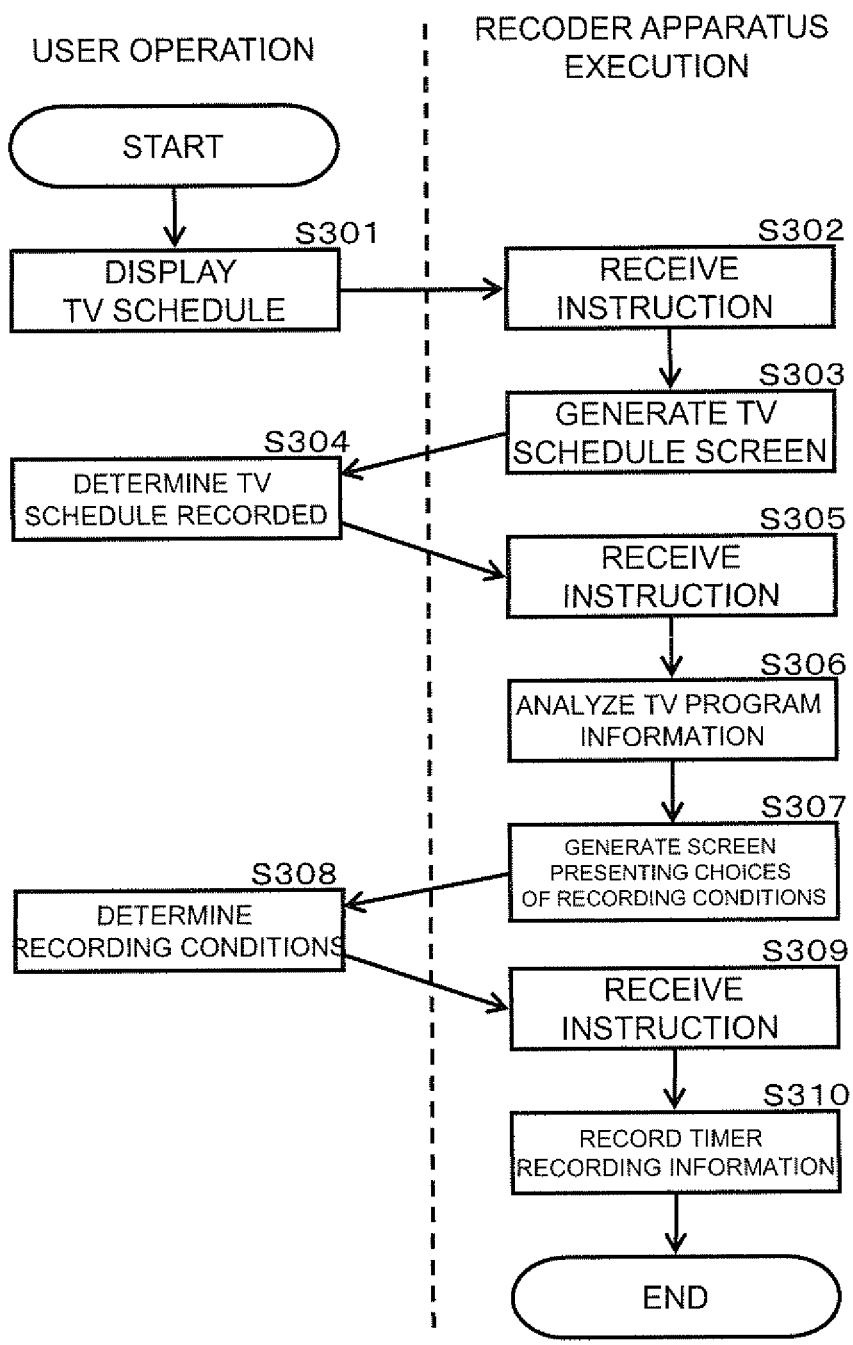
FIG. 3 is a flow chart showing an example of processing executed when the signal processor 104 according to the embodiment performs timer recording.

FIG. 3 is a flow chart showing an example of processing executed when the signal processor 104 according to the embodiment performs timer recording. Step S301, step S304, and step S308 are process steps executed such that a user operates the remote-controller 7, and step S302, step S303, step S305, step S306, step S5307, step S309, and step S310 are process steps executed by the recorder apparatus 1.

1-3-1. Timer Recording Operation

The remote-controller 7 accepts an operation of a user and transmits a signal for displaying a TV schedule (to be referred to as a display signal hereinafter) to the receiver 105 of the recorder apparatus 1 (step S301). At this time, on the remote-controller 7, a user depresses a "TV schedule" button.

The screen generating unit 205 receives a display signal from the remote-controller 7 through the receiver 105 and the controller 204 (step S302).

Figure 4:
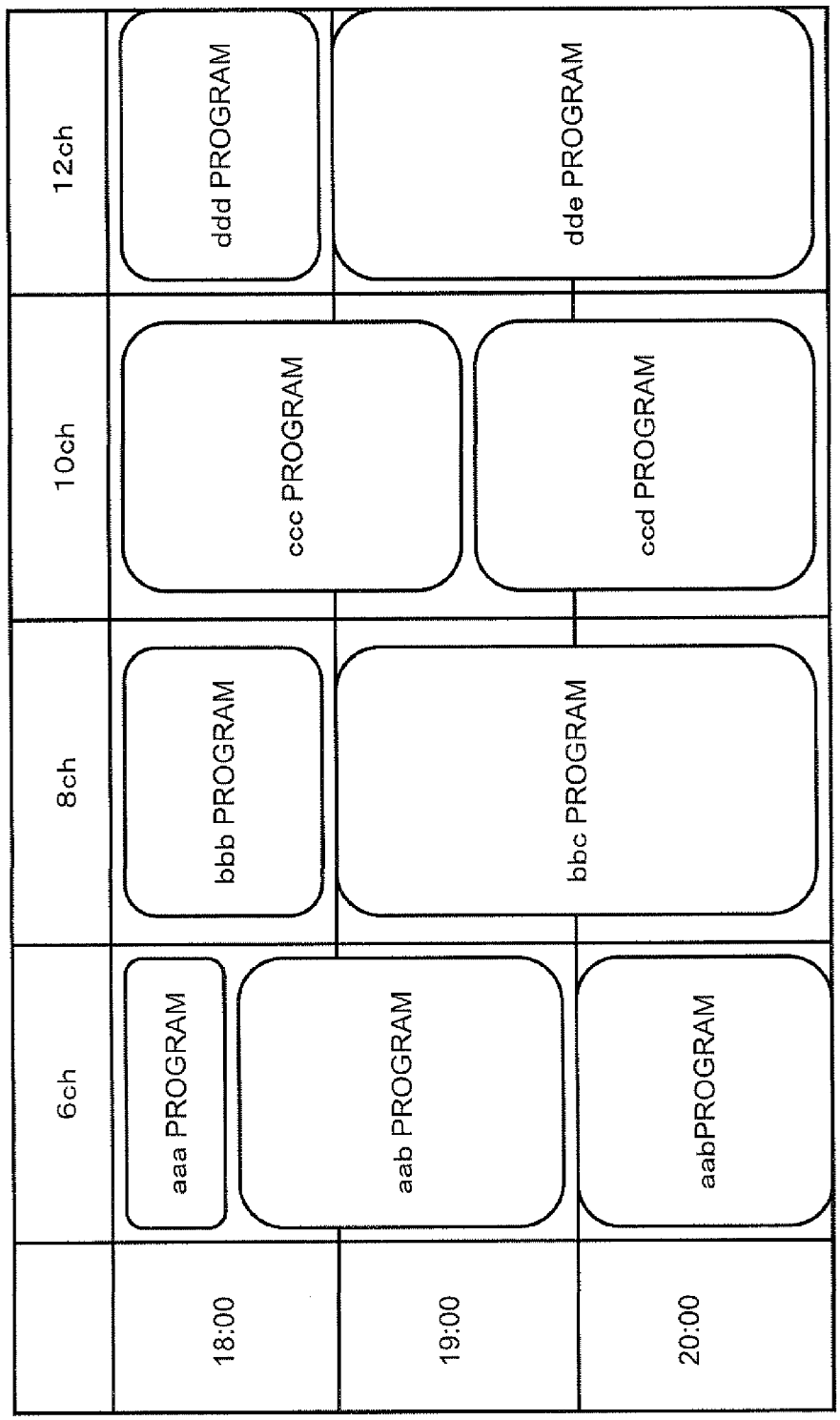
FIG. 4 is a diagram showing an example of a TV schedule in Embodiment 1.

The screen generating unit 205 generates a screen of the TV schedule according to the received display signal (step S303). At this time, the display 2 displays the TV schedule shown in FIG. 4.

A user performs timer recording of a specific program while watching the display 2 that displays the screen. The user operates the remote-controller 7 to designate a program by using a cursor displayed on the screen. At this time, the user depresses a determination button of the remote-controller 7. When the determination button is depressed, the remote-controller 7 transmits a selection signal to the receiver 105 (step S304).

The 3D video image determining unit 201 and the screen generating unit 205 receive the selection signal through the receiver 105 and the controller 204 (step S305).

The 3D video image determining unit 201 analyzes TV program information obtained by receiving a broadcast wave through the tuner 103 to determine whether a TV program subjected to timer recording is a TV program of 3D video image or a TV program of 2D video image (step S306). In this case, the TV program information includes information representing that an input stream is a TV program of 3D video image (to be referred to as 3D information hereinafter) or information representing that the input stream is a TV program of 2D video image (to be referred to as 2D information hereinafter). The 2D information or the 3D information is meta information added to each TV program. As the TV program information, for example, EPG (Electronic Program Guide) or the like is known.

The screen generating unit 205 generates a timer recording screen that presents TV program information related to a selection signal and choices of recording conditions based on the information and the selection signal obtained from the 3D video image determining unit 201 through the controller 204 (step S307). In this case, the recording conditions include information such as recording time and a recording mode that can be selected by a user or information related to a designated TV program. A detailed operation in step S307 will be described later.

A user determines a recording condition by using the remote-controller 7 while watching the screen. The user operates the remote-controller 7 to designate the recording condition by using a cursor displayed on the timer recording screen. At this time, the user depresses a determination button of the remote-controller 7. When the determination button is depressed, the remote-controller 7 transmits a selection signal to the receiver 105 (step S308).

The controller 204 receives the selection signal transmitted from the remote-controller 7 through the receiver 105 (step S309).

The controller 204 records and holds a recording condition based on the received selection signal on the flash memory 107 (step S310).

1-3-2. Recording Operation

An example of processing executed when the signal processor 104 records a TV program subjected to timer recording will be described below with reference to the accompanying drawings.

Figure 5:
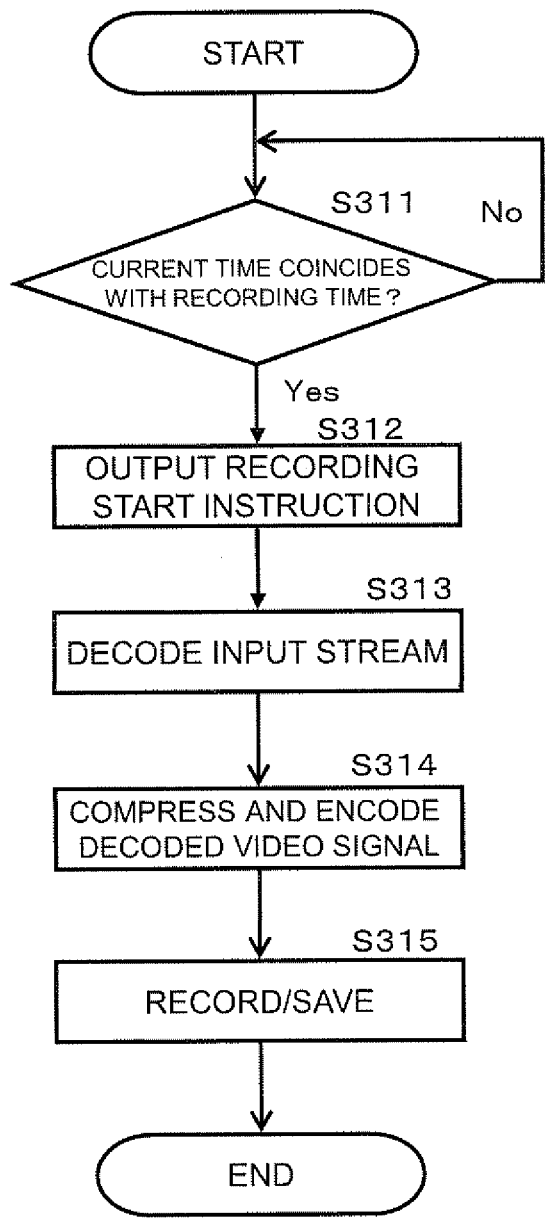
FIG. 5 is a flow chart showing an example of processing executed when the signal processor 104 according to Embodiment 1 performs recording.

FIG. 5 is a flow chart showing an example of processing executed when the signal processor 104 according to the embodiment performs recording.

The controller 204 monitors recording conditions recorded and held in the flash memory 107 and waits until current time coincides with recording time (step S311). When current time coincides with recording time, the controller 204 shifts to step S312. When current time is time before the recording time, the controller 204 waits without performing an operation.

When current time coincides with the recording time, the controller 204 outputs a recording start signal to the decoder 202. The controller 204 outputs a signal related to a recording condition to the encoder 203 (step S312).

When the decoder 202 receives the recording start signal from the controller 204, the decoder 202 decodes an input stream obtained by receiving a broadcast wave through the tuner 103 and outputs a generated decoded image to the encoder 203 (step S313).

The encoder 203 compresses and encodes the decoded video signal output from the decoder 202 based on the recording condition received from the controller 204 (step S314).

The encoder 203 records the obtained encoding stream in any one of the HDD device 4, the BD disk 3, and the SD card 5 (step S313). One of the HDD device 4, the BD disk 3, and the SD card 5 in which the encoding stream should be recorded can be selected by the user through the remote-controller 7. When the encoder 203 receives a recording condition in which the decoded video signal is recorded without being encoded, the encoder 203 directly records the decoded video signal in the HDD device 4, the BD disk 3, or the SD card 5.

1-3-4. Regulation of Recording Mode

An example of detailed processing executed in step S307 will be described below with reference to the accompanying drawings.

Figure 6:
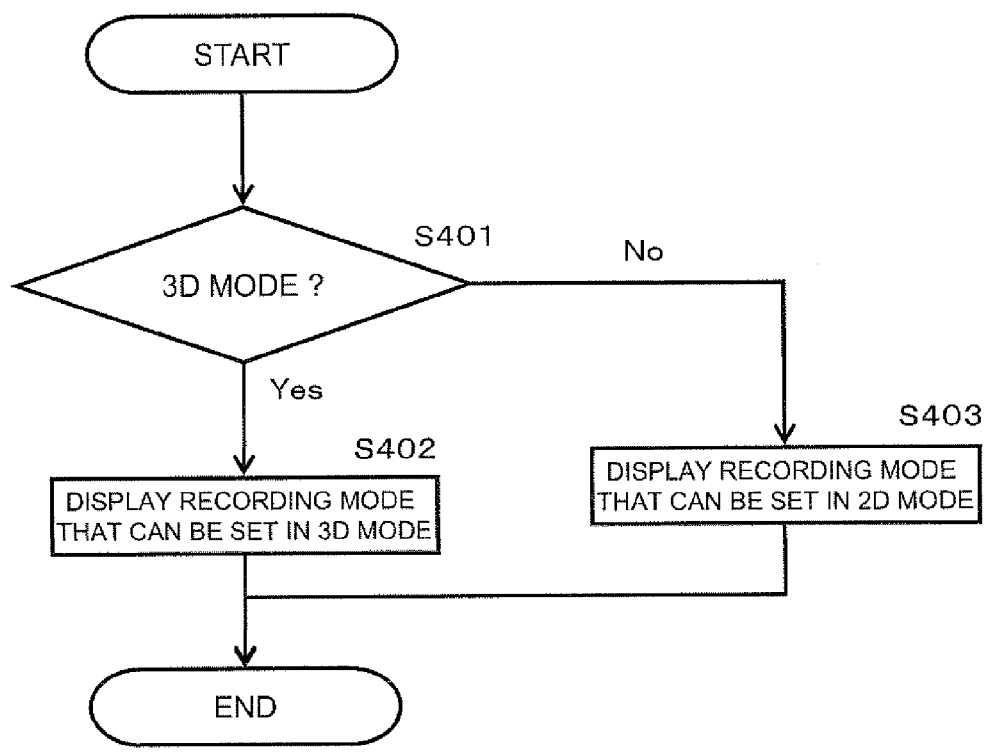
FIG. 6 is a flow chart showing an example of a process of generating a timer recording screen in which a screen generating unit 205 according to Embodiment 1 presents choices of recording conditions.

FIG. 6 is a flow chart showing an example of a process of generating a timer recording screen in which the screen generating unit 205 presents choices of recording conditions.

Figure 7:
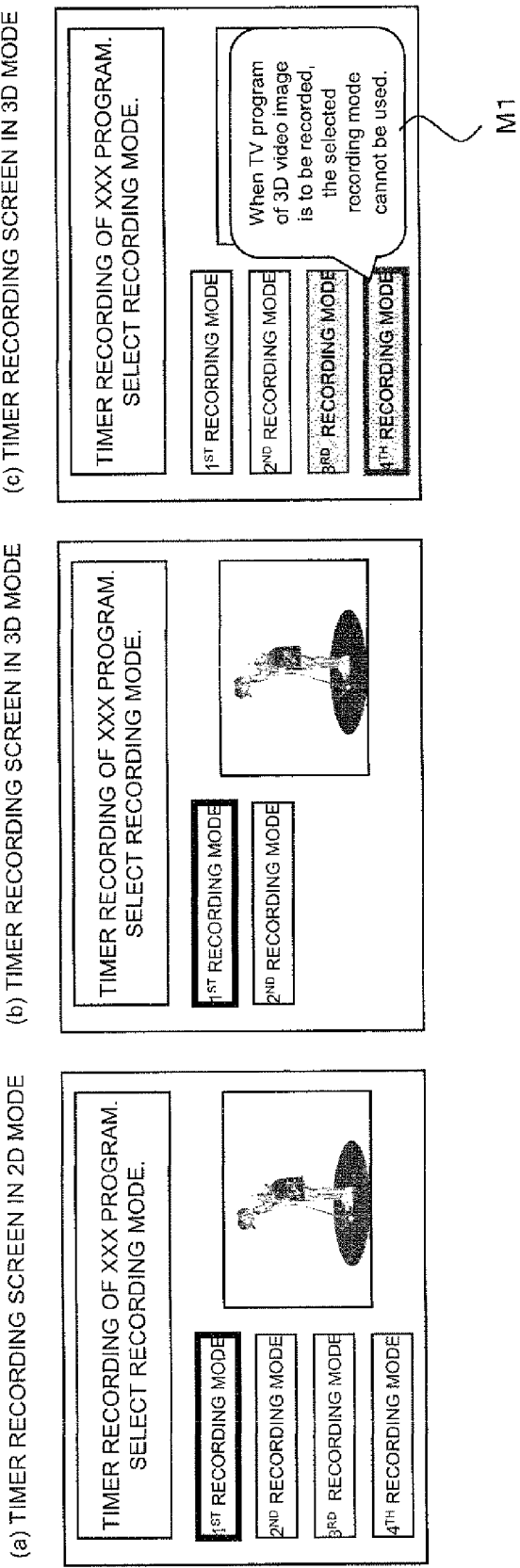
FIG. 7 is a diagram showing an example of a screen on which the screen generating unit 205 according to Embodiment 1 presents choices of recording conditions.

FIG. 7 is a diagram showing an example of a screen on which the screen generating unit 205 presents choices of recording conditions. In this case, FIG. 7(a) is a diagram showing an example of a timer recording screen generated by the screen generating unit 205 when the 3D video image determining unit 201 determines a TV program as a TV program of 2D video image. In this case, FIGS. 7(b) and 7(c) are diagrams showing an example of a timer recording screen generated by the screen generating unit 205 when the 3D video image determining unit 201 determines a TV program as a TV program of 3D video image.

The controller 204 determines, based on information obtained from the 3D video image determining unit 201, whether the mode of a currently received TV program is a two-dimensional mode or a three-dimensional mode (step S401). When the controller 204 determines the mode as the three-dimensional mode, the controller 204 shifts to step S402. On the other hand, when the controller 204 determines the mode as the two-dimensional mode, the controller 204 shifts to step S403. The controller 204 may set, based on a signal from the receiver 105, the two-dimensional mode or the three-dimensional mode. In this case, the controller 204 can set the two modes based on a signal from a user.

When the controller 204 determines the mode as the two-dimensional mode (No in step S401), the controller 204 can set a specific recording mode. The screen generating unit 205 generates, based on the recording mode, a timer recording screen shown in, for example, FIG. 7(a). In this case, as shown in FIG. 7(a), a plurality of recording modes that can be set by the controller 204 in the two-dimensional mode are displayed (step S403). The timer recording screen shown in FIG. 7(a) can set a first recording mode to a fourth recording mode. In this case, the highest target recording rate is set in the first recording mode. Furthermore, when the first recording mode gradually changes into the fourth recording mode, a target recording rate decreases. More specifically, the fourth recording mode has the lowest target recording rate. The screen generating unit 205 may generate a screen on which a recording mode previously set by a user in the two-dimensional mode is highlighted. In this case, the screen generating unit 205 sets the recording mode previously set in the two-dimensional mode of the recording modes stored in the flash memory 107 to a selective state. The screen generating unit 205 generates a timer recording screen on which the recording mode set to the selective state is highlighted.

On the other hand, when the controller 204 determines the mode as the three-dimensional mode (Yes in step S401), the controller 204 can set a specific recording mode. For example, the controller 204 can set some recording modes of the recording modes that can be set in the two-dimensional mode. The screen generating unit 205 generates a timer recording screen shown in, for example, FIG. 7(b). In this case, as shown in FIG. 7(b), only the recording modes that can be set in the three-dimensional mode are displayed (step S402). As shown in FIG. 7(a) and FIG. 7(b), the two-dimensional mode and the three-dimensional mode have different combinations of settable recording modes. In short, in FIG. 7(b), of the recording modes that can be set in the two-dimensional mode, some recording modes are invisibly displayed. More specifically, a user cannot visually recognize the third recording mode and the fourth recording mode on the timer recording screen. For this reason, the user cannot select the third recording mode and the fourth recording mode. The screen generating unit 205 may generate a screen on which a recording mode previously set by a user in the three-dimensional mode is highlighted. In this case, the screen generating unit 205 sets the recording mode previously set in the three-dimensional mode of the recording modes stored in the flash memory 107 to a selective state. The screen generating unit 205 generates a screen on which the recording mode set in the selective state is highlighted.

The screen generating unit 205 may generate a timer recording screen as shown in FIG. 7(c). On the timer recording screen in FIG. 7(c), display is executed in a manner representing that some recording modes of the recording modes that can be set in the two-dimensional mode cannot be set. In this case, a user can visually recognize the third recording mode and the fourth recording mode on the timer recording screen. However, the user cannot set the third recording mode and the fourth recording mode. In FIG. 7(c), the third recording mode and the fourth recording mode are displayed in different colors. In this manner, the user can understand that the third recording mode and the fourth recording mode cannot be set. Furthermore, in FIG. 7(c), when a cursor is located on an unsettable recording mode, for example, a warning message M1 representing "when TV program of 3D video image is to be recorded, the selected recording mode cannot be used" is displayed as a pop-up. In this case, the displayed warning message M1 is a message representing that a recording mode highlighted by a cursor cannot be set.

In this case, in the three-dimensional mode, the screen generating unit 205 may generate a timer recording screen such that only a recording mode having a low recording rate cannot be selected. For example, the screen generating unit 205 generates a timer recording screen on which only the fourth recording mode cannot be selected.

As shown in FIG. 7(c), the screen generating unit 205 may generate a timer recording screen such that a predetermined number of recording modes having lower recording rates cannot be selected. Furthermore, the screen generating unit 205 may generate a timer recording screen such that recording modes except for the recording mode having the highest recording rate cannot be selected. For example, the screen generating unit 205 generates a timer recording screen such that the recording modes except for the first recording mode cannot be selected.

A configuration in which a TV program of 3D video image can be recorded in a 2D mode based on a signal or the like from the remote-controller 7 may be employed.

1-3-5. Display of Warning Message 1-3-5-1. Warning Message on Timer Recording Screen A timer recording screen obtained when a cursor is located on a recording mode that cannot be set in a three-dimensional mode will be described below with reference to the accompanying drawings. For the sake of descriptive convenience, although an operation in the three-dimensional mode will be described below, the same operation as in the three-dimensional mode can also be realized in the two-dimensional mode.

When the three-dimensional mode is set, when a cursor is located on an unsettable recording mode, the screen generating unit 205 generates a screen added with a warning message. In short, when a user selects an unsettable recording mode, the screen generating unit 205 displays a warning message on the display 2.

FIG. 8 is a diagram showing a timer recording screen on which a warning message is displayed.

As shown in FIG. 8(a), when the three-dimensional mode is set, a cursor on the timer recording screen is located on a second recording mode. At this time, it is assumed that the cursor is moved from the second recording mode to a fourth recording mode. At this time, the screen generating unit 205, as shown in FIG. 8(b), generates a timer recording screen added with a warning message M2 representing that the fourth recording mode cannot be set, for example, "when TV program of 3D video image is to be recorded, the selected recording mode cannot be used".

Figure 9:
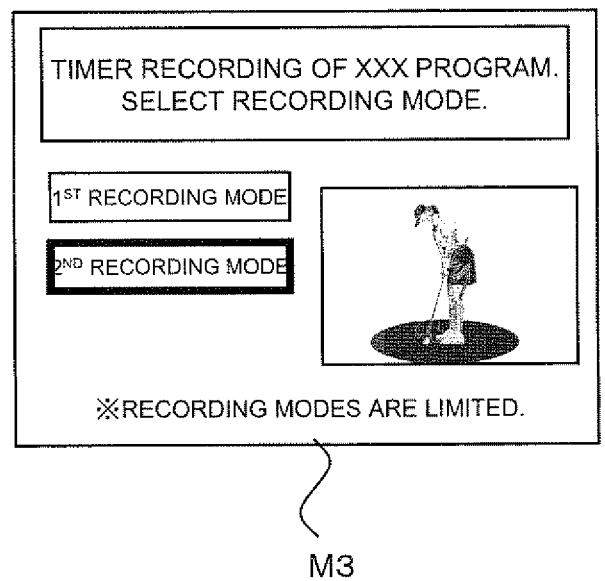
FIG. 9 is a diagram showing a timer recording screen on which a warning message in Embodiment 1 is displayed.

The screen generating unit 205 may generate a timer recording screen added with a warning message as shown in FIG. 9. As shown in FIG. 9, the screen generating unit 205 adds a warning message M3 representing that some recording modes of the recording modes that can be set in the two-dimensional mode are limited, for example, "recording modes are limited" to the timer recording screen.

As the warning message, a message representing that a recording mode having the highest target recording rate is recommended, for example, "first recording mode is recommended" may be used.

Alternatively, the warning message may be a message representing that a recording mode having a low rate of the recording modes that can be selected in the two-dimensional mode is limited, for example, "recording mode having low rate is prohibited".

1-3-5-2. Additional Operation of Warning Message

An operation of adding a warning message to a timer recording screen by the screen generating unit 205 will be described below with reference to the accompanying drawings.

Figure 10:
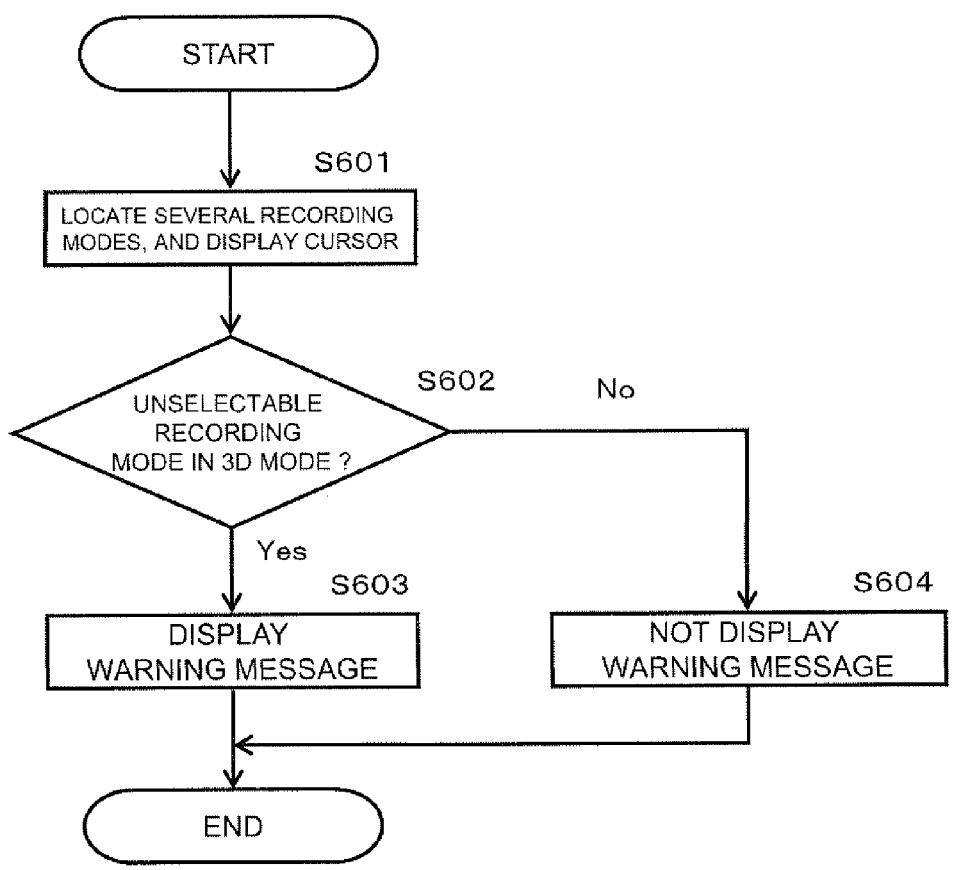
FIG. 10 is a flow chart showing an example of a process of adding a warning message onto a timer recording screen by the screen generating unit 205 in Embodiment 1.
Figure 11:
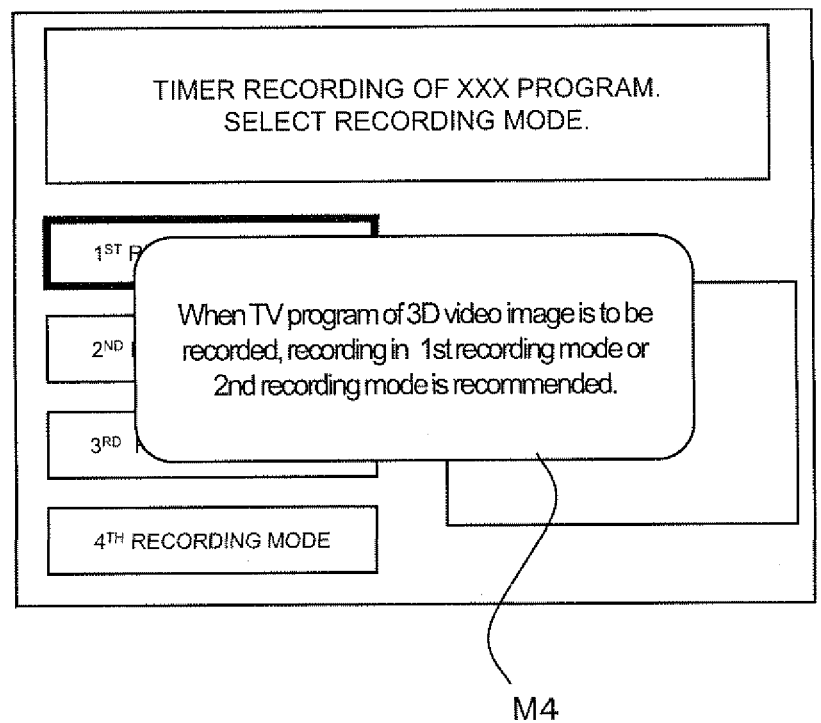
FIG. 11 is a diagram showing an example of a timer recording screen generated by the screen generating unit 205 according to Embodiment 1 when a three-dimensional mode is set.

FIG. 10 is a flow chart showing an example of a process of adding a warning message onto a timer recording screen by the screen generating unit 205. FIG. 11 is a diagram showing an example of a timer recording screen generated by the screen generating unit 205 when the three-dimensional mode is set.

The screen generating unit 205 generates the screen shown in FIG. 7(*a*). In this case, the screen generating unit 205 locates a cursor on any one of the plurality of recording modes shown in FIG. 7(*a*) to highlight the corresponding recording mode (step S601).

The controller 204 sets an operation mode to the two-dimensional mode or the three-dimensional mode based on information obtained from the 3D video image determining unit 201. Furthermore, the controller 204 determines whether the recording mode to which the cursor is moved by the user is a recording mode that can be set at the present (step S602). When the mode to which the cursor is moved is an unselectable recording mode in the three-dimensional mode (No in step S602), the controller 204 shifts to step S603. On the other hand, otherwise, the controller 204 shifts to step S604.

In step S602, when the mode to which the cursor is moved is an unsettable recording mode in the three-dimensional mode (Yes in step S602), the screen generating unit 205 displays, as shown in FIG. 11, for example, a warning message M4 representing "when TV program of 3D video image is to be recorded, recording in the first recording mode or the second recording mode is recommended" and then generates a timer recording screen (step S603). When No is determined in step S602, the screen generating unit 205 generates a recording screen without displaying a warning message (step S604).

When a recording mode that cannot set when the two-dimensional mode is set is highlighted, the screen generating unit 205 may be configured to generate a screen added with a warning message.

1-4. Conclusion

The recorder apparatus 1 according to Embodiment 1 includes the controller 204 that sets a conversion mode used when an input stream is processed and converted into a recording stream to any one of a two-dimensional mode that converts the input stream into a two-dimensional recording stream and a three-dimensional mode that converts the input stream into a three-dimensional recording stream, the controller 204 that sets at least one recording mode that can be used when the video signal is converted and processed in the two-dimensional mode and the three-dimensional mode and specifies a recording rate, and the signal processor 104 that processes the video signal based on the set conversion mode and the set recording mode to convert the video signal into a recording video signal. The controller 204 sets the recording modes such that a combination of the recording modes that can be set when the two-dimensional mode is set is different from a combination of recording modes that can be set when the three-dimensional mode is set.

In this manner, the recorder apparatus 1 can show recording modes having different combinations to a user when a three-dimensional mode is set and when a two-dimensional mode is set. In this manner, when a converting operation of an input stream is set, recording modes matched with the video characteristics of a 2D video image and a 3D video image can be set, respectively. In a 3D video image, in comparison with a 2D video image, when a user visually recognizes a video image, an encoding distortion such as block noise or mosquito noise more adversely affects image quality. When the recording modes that can be used in recording of a 3D video image and recording of a 2D video image are made different from each other, while various recording modes can be used in the recording of the 2D video image, a recording mode at a low recording mode in which block noise or the like easily occurs can be prohibited from being used in the recording of the 3D video image. In this manner, a poor-image-quality 3D video image can be prevented from being recorded while keeping user's convenience in recording of a 2D video image. Thus, the recorder apparatus 1 capable of presenting a video image that can be preferably visually recognized by a user regardless of video formats can be provided.

Furthermore, preferably, the controller 204, in the three-dimensional mode, can set at least a recording mode having the lowest recording rate of recording modes that can be set in the two-dimensional mode.

In this manner, when a three-dimensional mode is set, a user cannot select at least a recording mode having the lowest recording rate from recording modes that can be selected in a two-dimensional mode. In this manner, influences of encoding distortions such as block noise and mosquito noise can be reliably reduced when a user visually recognizes a video image. Thus, even though a user sets any one of the recording modes that can, be selected in the three-dimensional mode, the minimum image quality of a recording stream can be assured.

Furthermore, preferably, the controller 204, in the three-dimensional mode, prohibits at least one recording mode except for a recording mode having the highest recording rate of the recording modes that can be set in the two-dimensional mode.

In this manner, when the three-dimensional mode is set, the user can necessarily select the recording mode having the highest recording rate. Accordingly, the highest image quality of a recording stream obtained in the three-dimensional mode can be assured.

Preferably, the flash memory 107 that stores information representing the recording mode previously set by the controller 204 in the two-dimensional mode and information representing the recording mode previously set by the controller 204 in the three-dimensional mode is further arranged.

In this manner, the information representing the recording modes that are previously set in the two-dimensional mode and the three-dimensional mode can be stored. Accordingly, a resume function in the two-dimensional mode and a resume function in the three-dimensional mode can be independently realized.

Furthermore, preferably, the controller 204 has an operation mode that will set a recording mode when the signal processor 104 performs a converting process based on at least the information stored in the flash memory 107.

In this manner, the previously set recording mode can be set in the current two-dimensional mode and the current three-dimensional mode. Accordingly, a resume function in the two-dimensional mode and a resume function in the three-dimensional mode can be independently realized.

Preferably, the screen generating unit 205 that generates a selecting screen used to select a recording mode set by the controller 204 is further arranged. The screen generating unit 205 generates a selecting screen added with information representing that, in the case in which the controller 204 sets the three-dimensional mode, the recording mode set by the controller 204 is limited in comparison with the case in which the controller 204 sets the two-dimensional mode.

In this manner, when the three-dimensional mode is set, the user can be caused to visually recognize that some recording modes of the recording modes that can be set in the two-dimensional mode are limited. Accordingly, even though the three-dimensional mode is set, the user can reduce her/his uncomfortable feeling to an operation of the recorder apparatus.

Preferably, the information representing that the recording modes that can be set by the controller 204 are limited includes information representing that a recording mode having a low recording rate of the recording modes that can be set by the controller 204 when the controller 204 sets the two-dimensional mode is prohibited.

In this manner, when the three-dimensional mode is set, the user can be caused to visually recognize that a recording mode having a low recording rate of the recording modes that can be set in the two-dimensional mode is limited. Accordingly, when the three-dimensional mode is set to limit selectable recording modes, the frequency of causing a user to erroneously understand that the recording modes are limited can be reduced.

Preferably, the screen generating unit 205 that generates a selecting screen used to select a recording mode set by the controller 204 is further arranged. The screen generating unit 205 generates a selecting screen added with information representing that the recording mode having a high recording rate of the recording modes that can be set by the controller 204 is recommended when the controller 204 sets the three-dimensional mode.

In this manner, when the three-dimensional mode is set, the recording mode having the highest recording rate can be recommended for the user. For this reason, the probability of selection of the recording mode having the highest recording rate by the user can be increased.

Preferably, the screen generating unit 205 that generates a selecting screen used to select a recording mode set by the controller 204 is further arranged. The screen generating unit 205 generates a selecting screen added with information representing that the recording modes that can be set by the controller 204 when the controller 204 sets the two-dimensional mode is limited when the controller 204 sets the three-dimensional mode.

In this manner, when the three-dimensional mode is set, the user can be caused to visually recognize that some recording modes of the recording modes that can be set in the two-dimensional mode are limited. Accordingly, even though the three-dimensional mode is set, the user can reduce her/his uncomfortable feeling to an operation of the recorder apparatus.

Embodiment 2

Embodiment 1 has described the configuration in which the flash memory 107 stores the recording mode set in the previous two-dimensional mode. Furthermore, the configuration in which the flash memory 107 stores the recording mode set in the previous three-dimensional mode has been described. The configuration in which the screen generating unit 205 sets a specific recording mode of the plurality of recording modes in a selective state has been described. Furthermore, the configuration in which, when the three-dimensional mode is set, the screen generating unit 205 sets the recording mode stored in the flash memory 107 and set in the previous three-dimensional mode in a selective state has been described. Furthermore, the configuration in which, when the two-dimensional mode is set, the screen generating unit 205 sets the recording mode stored in the flash memory 107 and set in the previous two-dimensional mode in a selective state has been described. The configuration in which the screen generating unit 205 generates a timer recording screen on which the recording mode set in the selective state is highlighted has been described.

However, the recorder apparatus 1 does not always include the flash memory 107 that stores the recording mode set in the previous two-dimensional mode and the recording mode set in the previous three-dimensional mode. More specifically, the flash memory 107 may be able to store only one recording mode.

In the configuration, the previously set recording mode may not be able to be set in the currently set two-dimensional mode or three-dimensional mode. In this case, in the operation in which the screen generating unit 205 sets the previously set recording mode in a selective state to generate a timer recording screen on which the recording mode is highlighted, the operationality of the user becomes poor. For example, even though a recording mode that cannot be selected is set in a selective state, the user must move the cursor from the position of the recording mode to spoil the operationality.

Thus, in Embodiment 2, to solve the above problem, it is an object that a recorder apparatus that makes it possible to select a recording mode that can be set in the two-dimensional mode or the three-dimensional mode set at the present is provided.

The recorder apparatus according to Embodiment 2 has operations of the flash memory 107 and the screen generating unit 205 different from those in the recorder apparatus 1 according to Embodiment 1. The differences in the flash memory 107 and the screen generating unit 205 will be described below in detail. Configurations other than the flash memory 107 and the screen generating unit 205 are the same as those in the operation of the recorder apparatus 1 according to Embodiment 1. For this reason, the same reference numerals as in Embodiment 1 denote the same configurations in Embodiment 2, and a detailed description thereof will be omitted.

2-1. Recorder Apparatus and Peripheral Apparatus Therefor

A recorder apparatus according to Embodiment 2 will be described below with reference to the accompanying drawings.

Figure 12:
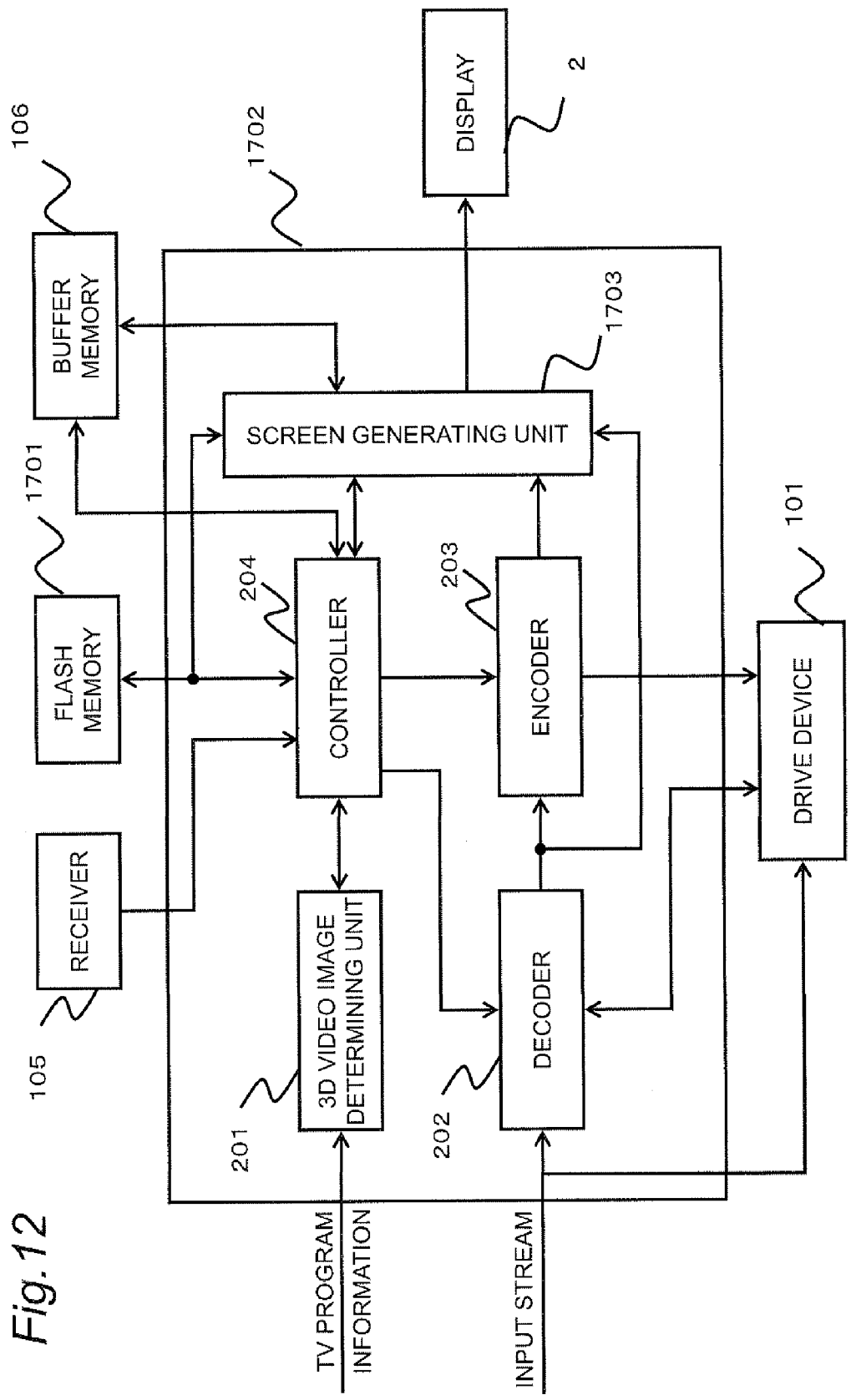
FIG. 12 is a diagram showing a configuration of a signal processor 1702 according to Embodiment 2.

FIG. 12 is a diagram showing a configuration of a signal processor 1702 according to Embodiment 2. The same reference numerals as in Embodiment 1 denote the same configurations in Embodiment 2, and a detailed description thereof will be omitted.

The recorder apparatus in Embodiment 2 further includes a flash memory 1701 in comparison with the recorder apparatus 1 according to Embodiment 1.

The flash memory 1701 stores programs and the like executed by the signal processor 1702. The flash memory 1701 holds a recording mode previously set by the signal processor 1702. The flash memory 1701, unlike the flash memory 107 according to Embodiment 1, stores one recording mode previously set in the three-dimensional mode or the two-dimensional mode.

The signal processor 1702 includes a function included in the signal processor 104 according to Embodiment 1. The signal processor 1702 has a function of setting the recording mode to a selective state based on the previously selected recording mode stored in the flash memory 107. The function is a function of setting, to a selective state, recording modes except for the unselectable recording modes when a recording mode stored in the flash memory 1701 cannot be selected in the two-dimensional mode or the three-dimensional mode set at the present. In particular, the signal processor 1702 further includes a screen generating unit 1703.

2-1-1. Screen Generating Unit

A concrete configuration of the screen generating unit 1703 will be described below with reference to the accompanying drawings.

The screen generating unit 1703 generates a screen displayed on the display 2 based on control information from the controller 204. The screen generating unit 205 sets a recording mode to a selective state on the generated screen based on the control information from the controller 204. Furthermore, the screen generating unit 1703 sets a recording mode to a selective state on the generated screen by using the previously set recording mode stored in the flash memory 1701 and previously set. The screen generating unit 1703 generates a screen on which the recording mode set in the selective state is highlighted.

2-2. Operation of Screen Generating Unit 2-2-1. Operation of Setting to Selective State A concrete operation of the screen generating unit 1703 will be described below with reference to the accompanying drawings.

Figure 13:
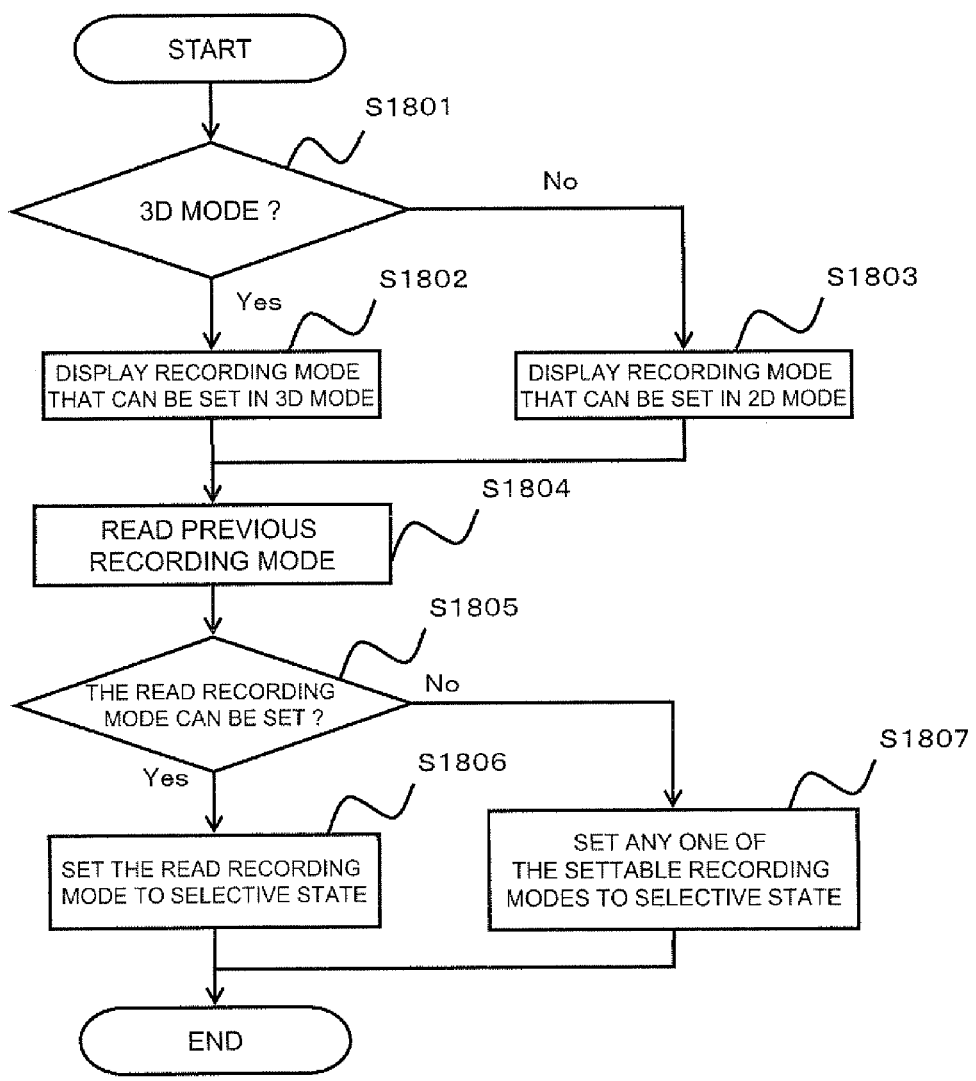
FIG. 13 is a flow chart showing an example of a process of setting recording modes in Embodiment 2 to a selective state.

FIG. 13 is a flow chart showing an example of a process of setting recording modes to a selective state.

The controller 204 determines, based on information obtained from the 3D video image determining unit 201, whether the mode of a currently received TV program is a two-dimensional mode or a three-dimensional mode (step S1801). When the controller 204 determines the mode as the three-dimensional mode (Yes in step S1801), the controller 204 shifts to step S1802. When the controller 204 determines the mode as the two-dimensional mode (No in step S1801), the controller 204 shifts to step S1803. The controller 204 may set, based on a signal from the receiver 105, the two-dimensional mode or the three-dimensional mode. In this case, the controller 204 can set the two modes based on a signal from a user.

In step 1801, when the controller 204 determines the mode as the two-dimensional mode (No in step S1801), the controller 204 can set a specific recording mode (step S1803). For example, the controller 204 can set recording modes having target recording rates corresponding to 16 Mbps, 8 Mbps, 3 Mbps, and 1 Mbps. In this manner, the user can select recording modes of four types corresponding to 16 Mbps to 1 Mbps.

On the other hand, in step 1801, when the controller 204 determines the mode as the three-dimensional mode (Yes in step S1801), the controller 204 can set a combination of specific recording modes different from that in the two-dimensional mode (S1802). More specifically, the controller 204 can set some recording modes of the recording modes that can be set in the two-dimensional mode, or a new recording mode. For example, the controller 204 can set recording modes having target recording rates corresponding to 16 Mbps, 12 Mbps, and 8 Mbps. In this manner, the user can select recording modes of three types corresponding to 16 Mbps to 8 Mbps.

The screen generating unit 1703 reads a previously set recording mode stored in the flash memory 1701 (step S1804).

The screen generating unit 1703 determines whether the read recording mode is included in the recording modes that can be set at the present (step S1805). When the read recording mode is included in the recording modes that can be set at the present, the controller 204 shifts to step S1806. When the read recording mode is not included in the recording modes that can be set at the present, the controller 204 shifts to step S1807. For example, when the target recording rate corresponding to the read recording mode is 16 Mbps, and when recording modes having target recording rates corresponding to 16 Mbps, 12 Mbps, and 8 Mbps can be set, the controller 204 shifts to step S1806. On the other hand, when the target recording rate corresponding to the read recording mode is 1 Mbps, and when recording modes having target recording rates corresponding to 16 Mbps, 12 Mbps, and 8 Mbps can be set, the controller 204 shifts to step S1807.

When Yes in step S1805, the screen generating unit 1703 sets the read recording mode to a selective state (step S1806). The selective state is a state in which a user selects a specific recording mode with a cursor. The processing according to the flow chart shown in FIG. 13 is ended. For example, when the recording mode having the target recording mode corresponding to 16 Mbps is read, the screen generating unit 1703 sets the recording mode to a selective state.

On the other hand, when No in step S1805, the screen generating unit 1703 sets any one of the settable recording modes to a selective state (step S1807). The processing according to the flow chart shown in FIG. 13 is ended. For example, the screen generating unit 1703 sets, of the recording modes that can be set at the present, a recording mode having the highest recording rate to a selective state.

As another configuration, in step S1806, of the recording modes that can be set at the present, a recording mode except for the read recording mode may be set to a selective state. For example, when the target recording rate corresponding to the read recording mode is 16 Mbps, and when recording modes having target recording rates corresponding to 16 Mbps, 12 Mbps, and 8 Mbps can be set, the screen generating unit 1703 may set the recording mode corresponding to 12 Mbps or 8 Mbps to a selective state.

In step S1807, the screen generating unit 1703 sets, of the recording modes that can be set at the present, a recording mode having the lowest recording rate to a selective state. The screen generating unit 1703 may set a recording mode corresponding to a recording rate closest to the target recording rate of the read recording mode to a selective state. In this case, the user can naturally record a video signal having image quality close to that of a previously recorded video signal.

2-2-2. Screen Generated by Screen Generating Unit

A screen generated by the screen generating unit 1703 will be described below with reference to the accompanying drawings.

The screen generating unit 1703, based on the operation described in 2-2-1, generates a screen on which the recording mode set to the selective state is highlighted. More specifically, the screen generating unit 1703 generates a screen on which a cursor is located on the recording mode set to a selective state.

The following four transition patterns on the screen generated by the screen generating unit 1703 will be described below.

(1) In the case where the three-dimensional mode is set at the present, and the previously set recording mode can be set.
(2) In the case where the three-dimensional mode is set at the present, and the previously set recording mode cannot be set.
(3) In the case where the two-dimensional mode is set at the present, and the previously set recording mode can be set.
(4) In the case where the two-dimensional mode is set at the present, and the previously set recording mode cannot be set.

For the sake of descriptive convenience, a case where the controller 204 can set the first recording mode, the second recording mode, the third recording mode, and the fourth recording mode in the two-dimensional mode will be considered below. A case where the controller 204 can set the first recording mode and the second recording mode in the three-dimensional mode will be considered below. The configuration is not limited to the above description, and the combination of the recording modes that can be set in the three-dimensional mode need only be different from the combination of the recording modes that can be set in the two-dimensional mode.

2-2-2-1. About Pattern (1)

The case where the three-dimensional mode is set at the present and the previously set recording mode can be set will be described below.

Figure 14:
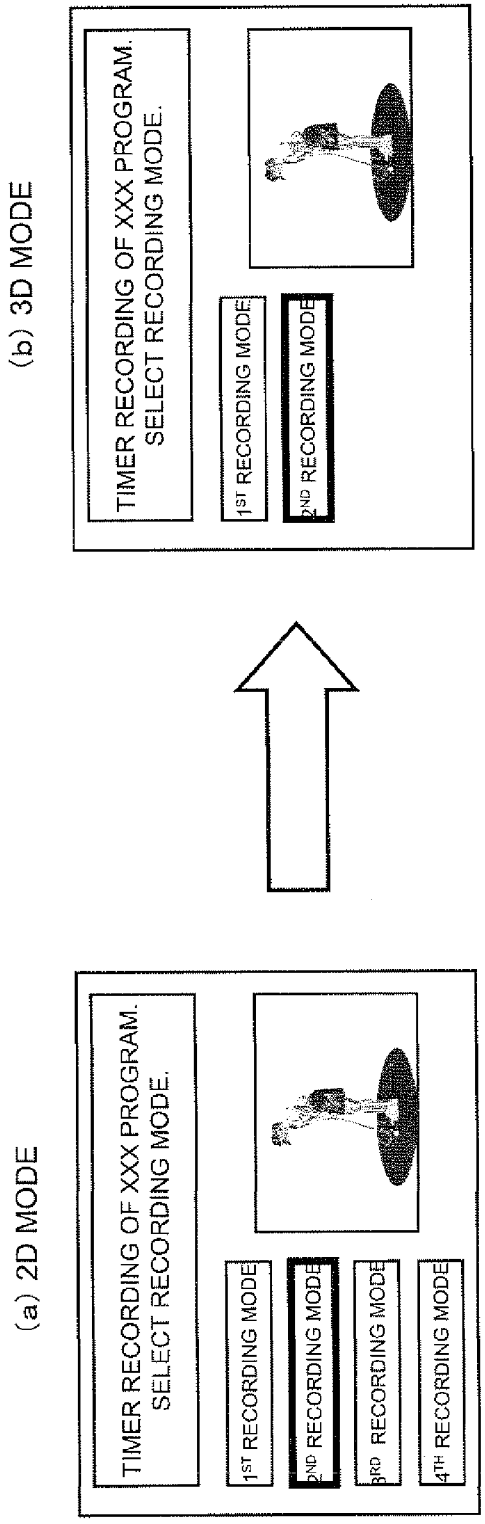
FIG. 14 is a diagram showing an example of cursor movement in Embodiment 2.

FIG. 14 is a diagram showing an example of cursor movement.

FIG. 14(*a*) is a diagram showing a previous timer recording operation in which a user sets a two-dimensional mode and then sets the second recording mode. In this case, the second recording mode is stored in the flash memory 1701.

FIG. 14(*b*) is a diagram showing a screen generated by the screen generating unit 1703 when the three-dimensional mode is set to the state shown in FIG. 14(*a*).

As shown in FIG. 14(*a*), when the two-dimensional mode is set, a cursor on the timer recording screen is located on the second recording mode. At this time, when the setting is changed from the two-dimensional mode into the three-dimensional mode, the position of the cursor is a position shown in FIG. 14(*b*). More specifically, the cursor position is the position of the previously set second recording mode. Note that, in (1), the screen generating unit 1703 may generate a screen on which the cursor is located on a recording mode having the highest target recording rate of recording modes that can be set in the three-dimensional mode.

The combination of recording modes set by the controller 204 is not limed to the above configuration, and another combination may be used.

2-2-2-2. About Pattern (2)

The case where the three-dimensional mode is set at the present and the previously set recording mode cannot be set will be described below.

FIG. 15 is a diagram showing an example of cursor movement.

FIG. 15(*a*) is a diagram showing a previous timer recording operation in which a user sets a two-dimensional mode and then sets the third recording mode. In this case, the third recording mode is stored in the flash memory 1701.

FIG. 15(*b*) is a diagram showing a screen generated by the screen generating unit 1703 when the three-dimensional mode is set to the state shown in FIG. 15(*a*).

As shown in FIG. 15(*a*), when the two-dimensional mode is set, a cursor on the timer recording screen is located on the third recording mode. At this time, when the setting is changed from the two-dimensional mode into the three-dimensional mode, the position of the cursor is a position shown in FIG. 15(*b*). More specifically, the cursor position is the position of the second recording mode different from the recording mode stored in the flash memory 1701. More specifically, the screen generating unit 1703 generates a screen on which the cursor is located on a recording mode having the lowest target recording rate of recording modes that can be set in the three-dimensional mode. Note that, in (2), the screen generating unit 1703 may generate a screen on which the cursor is located on a recording mode having the highest target recording rate of recording modes that can be set in the three-dimensional mode.

Figure 16:
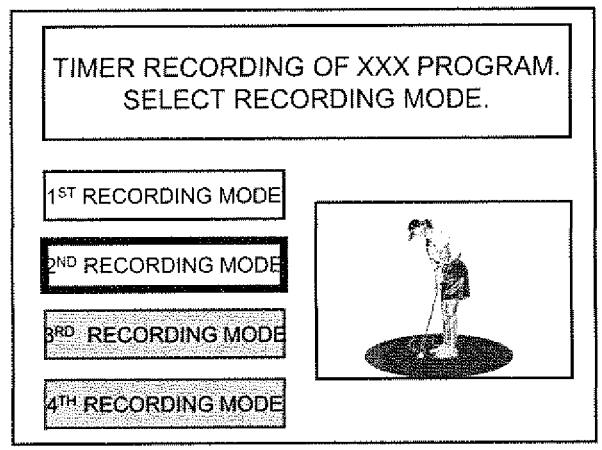
FIG. 16 is a diagram showing a screen generated by a screen generating unit 1703 in Embodiment 2.

The screen generating unit 1703, as shown in FIG. 16, unlike in FIG. 15(*b*), may generate a screen that displays the third recording mode and the fourth recording mode. In this case, the third recording mode and the fourth recording mode are faintly displayed to express that the third and fourth recording modes cannot be set. In this case, the objects of the third recording mode and the fourth recording mode may also be hatched to express that the third and fourth recording modes cannot be set. In short, any form having an aspect in which a user can recognize that the recording modes cannot be set when the user visually recognizes objects displayed on the screen may be used.

2-2-2-3. About Pattern (3)

The case where the two-dimensional mode is set at the present and the previously set recording mode can be set will be described below.

In this case, the screen generating unit 1703 generates a screen on which the cursor is located on an arbitrary recording mode of recording modes that can be set in the two-dimensional mode. A screen on which the cursor is located on the previously set recording mode is preferably generated.

2-2-2-4. About Pattern (4)

The case where the two-dimensional mode is set at the present and the previously set recording mode cannot be set will be described below.

FIG. 17 is a diagram showing an example of cursor movement.

FIG. 17(*a*) is a diagram showing a previous timer recording operation in which a user sets a three-dimensional mode and then sets the fifth recording mode. In this case, the fifth recording mode is stored in the flash memory 1701.

FIG. 17(*b*) is a diagram showing a screen generated by the screen generating unit 1703 when the two-dimensional mode is set to the state shown in FIG. 17(*a*).

As shown in FIG. 17(*a*), when the three-dimensional mode is set, a cursor on the timer recording screen is located on the fifth recording mode. At this time, when the setting is changed from the three-dimensional mode into the two-dimensional mode, the position of the cursor is a position shown in FIG. 17(b). More specifically, the cursor position is the position of the first recording mode different from the recording mode stored in the flash memory 1701. More specifically, the screen generating unit 1703 generates a screen on which the cursor is located on a recording mode having the highest target recording rate of recording modes that can be set in the two-dimensional mode. Note that, in (4), the screen generating unit 1703 may generate a screen on which the cursor is located on a recording mode having the lowest target recording rate of recording modes that can be set in the two-dimensional mode. The screen generating unit 1703 may generate a screen on which a cursor is located on a recording mode having a target recording rate close to the target recording rate of the recording mode stored in the flash memory 1701.

2-3. Conclusion

The recorder apparatus, unlike the constituent elements included in the recorder apparatus 1 according to Embodiment 1, includes the flash memory 1701 that stores information representing the recording mode previously set by the controller 204. The controller 204 has an operation mode that tries to set a recording mode in a conversion process by the signal processor 104 based on the information stored at least in the flash memory 1701, and, in the operation mode, when the recording mode represented by the information stored in the flash memory 1701 is a recording mode that cannot be set in the two-dimensional mode or the three-dimensional mode set by the controller 204, sets another recording mode in place of the recording mode represented by the information stored in the flash memory 1701.

In this manner, the previously set recording mode can be stored. A recording mode can be set by using the recorded recording mode. Even though the previous recording mode cannot be set in the two-dimensional mode or the three-dimensional mode that is currently set, another recording mode can be set in place of the previous recording mode. In this manner, the operationality of a user can be improved.

More preferably, the controller 204 sets any one of the recording modes that can be set in the two-dimensional mode and the three-dimensional mode set by the controller 204 as the another recording mode.

In this manner, when the recorder apparatus according to Embodiment 2 sets the two-dimensional mode or the three-dimensional mode, the recorder apparatus can automatically set a recording mode that can be set in the currently set two-dimensional mode and the currently set three-dimensional mode. Accordingly, the user can always start or set an operation in a recording mode that can be set in a current mode.

More preferably, the controller 204 sets a recording mode having the lowest recording rate of the recording modes that can be set in the two-dimensional mode or the three-dimensional mode set by the controller 204 as the another recording mode.

In this manner, when the two-dimensional mode or the three-dimensional mode is set, a recording mode having the lowest recording rate of the recording modes that can be set in the set two-dimensional mode or the set three-dimensional mode can be automatically set. Accordingly, the user can always start or set an operation in the recording mode having the lowest recording rate of the recording modes that can be set in the set two-dimensional mode or the set three-dimensional mode.

More preferably, the controller 204 sets a recording mode having the highest recording rate of the recording modes that can be set in the two-dimensional mode or the three-dimensional mode set by the controller 204 as the another recording mode.

In this manner, when the two-dimensional mode or the three-dimensional mode is set, a recording mode having the highest recording rate of the recording modes that can be set in the set two-dimensional mode or the set three-dimensional mode can be automatically set. Accordingly, the user can always start or set an operation in the recording mode having the highest recording rate of the recording modes that can be set in the set two-dimensional mode or the set three-dimensional mode.

The recorder apparatus preferably includes the flash memory 1701 that stores information representing a recording mode previously set by the controller 204 and the screen generating unit 1703 that generates a selecting screen used to select recording modes set by the controller 204. The screen generating unit 1703 highlights any one of the recording modes that can be set by the controller 204 in the two-dimensional mode or the three-dimensional mode set at the present, based on the information stored in the flash memory 1701.

In this manner, based on the recording mode stored in a storage unit, a screen on which any one of the recording modes that can be set in the currently set two-dimensional mode or the currently set three-dimensional mode is highlighted can be shown to the user. In this manner, the operationality of the user can be improved.

Another Embodiment

Although embodiments 1 and 2 have been described above, the present invention is not limited to the embodiments.

In Embodiments 1 and 2, according to TV program information obtained by receiving a broadcast wave of a video recorder, the three-dimensional mode or the two-dimensional mode is set. However, the setting may be performed based on encoding information such as header information of an input stream obtained when the input stream is decoded. The setting may be performed based on a degree of correlation obtained by executing a matching process to left-eye image data and right-eye image data. The two-dimensional mode or the three-dimensional mode may be designated by a user using the remote-controller 7. In this case, the remote-controller 7 includes a three-dimensional mode button and a two-dimensional mode button.

In the descriptions of Embodiments 1 and 2, a combination of recording modes that can be set in the two-dimensional mode is different from a combination of recording modes that can be set in the three-dimensional mode. However, the combination of the recording modes that can be set in the two-dimensional mode is conformed to the combination of the recording modes that can be set in the three-dimensional mode, and, for example, a warning message as shown in FIG. 11 may be displayed when a recording mode having a low recording rate in the three-dimensional mode is selected. In this case, although the warning message is displayed, since the recording modes that can be set in the three-dimensional mode are the same as those in the two-dimensional mode, there is no recording mode that cannot be selected in the three-dimensional mode. However, when the warning message is displayed, the probability that a user selects a recording mode having a high recording rate can be increased.

In Embodiments 1 and 2, by using a display method such as pop-up, a warning message is displayed. However, the display method is not limited to the above methods, and another display method that can inform a user of a message may be used. For example, a configuration that informs a user of a warning message by using an audio guidance may be used.

In Embodiments 1 and 2, a screen is generated and displayed on the display to present TV program information or recording conditions to a user. However, the information or the recording conditions may be presented by using voice or the like.

In Embodiment 1, in the middle of a selecting operation of a recording mode on a timer recording screen in the two-dimensional mode shown in FIG. 7(a), when a user performs a changing operation into the three-dimensional mode is performed to the remote-controller 7 by a user, a timer recording screen in the three-dimensional mode shown in FIG. 7(b) may be displayed. In the middle of a selecting operation of a recording mode on a timer recording screen in the three-dimensional mode shown in FIG. 7(b), when a changing operation into the two-dimensional mode is performed to the remote-controller 7 by a user, a timer recording screen in the two-dimensional mode shown in FIG. 7(a) may be displayed.

As another configuration, in the recorder apparatus, a 3D safety mode may be set. In this configuration, operations in the embodiments may be executed when the 3D safety mode is in an on state, and the recording modes that can be selected on a 3D video image and a 2D video image is not discriminated from each other when the 3D safety mode is in an off state.

In the descriptions of Embodiments 1 and 2, the present invention is applied to the recorder apparatus. However, the present invention can also be applied to a video camera or a digital camera that can take both a 3D video image and a 2D video image. In this case, the three-dimensional mode or the two-dimensional mode can be set depending on whether a mode in which the 3D video image is taken or a mode in which the 2D video image is taken is set.

The present invention can also be applied to a video signal converting method including the means included in the video signal converting apparatus as steps, a video signal converting integrated circuit including the means included in the video signal converting apparatus, and a video signal converting program that can realize the video signal converting method.

The video signal converting program can be distributed through recording media such as CD-ROMs (Compact Disc-Read Only Memory) and communication networks such as the Internet.

The video signal converting integrated circuit can be realized as an LSI serving as a typical integrated circuit. In this case, the LSI may be configured by one chip or a plurality of chips. For example, a functional block except for a memory may be configured by a 1-chip LSI. In this case, although the integrated circuit may be used as an LSI, the integrated circuit may also be called an IC, a system LSI, a super LSI, or an ultra LSI depending on degrees of integration.

The method of forming an integrated circuit is not limited to a method for an LSI, and the method may be realized by a dedicated circuit or a general-purpose processor. Alternatively, an FPGA (Field Programmable Gate Array) that can be programmed after an TSI is manufactured or a reconfigurable processor that can reconfigure connections and settings of circuit cells in the LSI may be used.

Furthermore, when a technique for an integrated circuit that is replaced with the technique for an LSI appears by development of a semiconductor technique or another technique derived therefrom, functional blocks may be integrated by using the technique as a matter of course. For example, the probability of applying bio-techniques or the like may be conceivable.

In formation of an integrated circuit, of the functional blocks, only a unit that stores data may be included in an independent configuration without being included in a 1-chip configuration.

The video signal converting apparatus can be applied to a video camera, a digital camera, or the like that can take a 2D video image and a 3D video image. In this case, when a 3D video image can be taken by attaching a 3D conversion lens to a camera main body, the recording mode may be set to a three-dimensional mode by attaching the 3D conversion lens, and the recording mode may be set to the two-dimensional mode when the 3D conversion lens is not attached.

INDUSTRIAL APPLICABILITY

The video signal converting apparatus according to the present invention converts a video signal into a recording video signal by performing a process such as compression encoding so as to make it possible that a user can comfortably view a 3D video image. For this reason, the video signal converting apparatus can be applied to a video recorder, a video camera, a digital camera, a personal computer, a mobile phone with camera, and the like.

DESCRIPTION OF REFERENCE CHARACTERS 1, 1702 Recorder apparatus
2 Display
3 BD disk
4 HDD device
5 SD card
6 Antenna
7 Remote-controller
101 Drive device
102 Input/output IF unit
103 Tuner
104 Signal processor
105 Receiver
106 Buffer memory
107, 1701 Flash memory
201 3D video determining unit
202 Decoder
203 Encoder
204 Controller
205, 1703 Screen generating unit

The invention claimed is:

1. A video signal converting apparatus comprising:
a conversion mode setting unit that sets a conversion mode used when a video signal is processed and converted into a recording video signal to any one of a two-dimensional mode that converts the video signal into a two-dimensional recording video signal and a three-dimensional mode that converts the video signal into a three-dimensional recording video signal;
a recording mode setting unit that sets at least one recording mode that can be used when the video signal is converted in each of the two-dimensional mode and the three-dimensional mode, each of the recording modes specifying a recording rate; and
a converting unit that processes the video signal and converts the processed video signal into a recording video signal based on the set conversion mode and the set recording mode, wherein
the recording mode setting unit sets a recording mode such that a combination of recording modes that can be set when the conversion mode setting unit sets the two-dimensional mode is different from a combination of recoding modes that can be set when the conversion mode setting unit sets the three-dimensional mode.

2. The video signal converting apparatus according to claim 1, wherein the recording mode setting unit prohibits a setting of at least a recording mode having the lowest recording rate of the recording modes that can be set in the two-dimensional mode in the three-dimensional mode.

3. The video signal converting apparatus according to claim 2, further comprising a storage unit that records information representing the recording mode previously set by the recording mode setting unit, wherein
the recording mode setting unit
has an operation mode that tries to set a recording mode set when the conversion unit performs a converting process based on the information stored at least in the storage unit, and
in the operation mode, when a recording mode represented by the information stored in the storage unit is a recording mode that cannot be set in the two-dimensional mode or the three-dimensional mode set by the conversion mode setting unit, sets another recording mode in place of the recording mode represented by the information stored in the storage unit.

4. The video signal converting apparatus according to claim 3, wherein the recording mode setting unit sets, as the other recording mode, any one of the recording modes that can be set in the two-dimensional mode or the three-dimensional mode set by the conversion mode setting unit.

5. The video signal converting apparatus according to claim 4, wherein the recording mode setting unit sets, as the other recording mode, a recording mode having the lowest recording rate of the recording modes that can be set in the two-dimensional mode or the three-dimensional mode set by the conversion mode setting unit.

6. The video signal converting apparatus according to claim 4, wherein the recording mode setting unit sets, as the other recording mode, a recording mode having the highest recording rate of the recording modes that can be set in the two-dimensional mode or the three-dimensional mode set by the conversion mode setting unit.

7. The video signal converting apparatus according to claim 1, comprising a storage unit that stores information representing a recording mode previously set by the recording mode setting unit in the two-dimensional mode and information representing a recording mode previously set by the recording mode setting unit in the three-dimensional mode.

8. The video signal converting apparatus according to claim 7, wherein the recording mode setting unit has an operation mode that tries to set a recording mode set when the conversion unit performs a converting process based on the information stored at least in the storage unit.

9. The video signal converting apparatus according to claim 1, further comprising:
a storage unit that stores information representing a recording mode previously set by the recording mode setting unit; and
a screen generating unit that generates a selection screen used to select a recording mode set by the recording mode setting unit, wherein
the screen generating unit highlights any one of the recording modes that can be set by the recording mode setting unit in the two-dimensional mode or the three-dimensional mode set at the present based on the information stored in the storage unit.

10. The video signal converting apparatus according to claim 1, further comprising a screen generating unit that generates a selection screen used to select a recording mode set by the recording mode setting unit, wherein
the screen generating unit, when the conversion mode setting unit sets the three-dimensional mode, generates a selection screen added with information representing that recording modes that can be set by the recording mode setting unit are limited in comparison with a case in which the conversion mode setting unit sets the two-dimensional mode.

11. The video signal converting apparatus according to claim 10, wherein the information representing that the recording modes that can be set by the recording mode setting unit are limited includes information representing that, of the recording modes that can be set by the recording mode setting unit when the conversion mode setting unit sets the two-dimensional mode, a recording mode having a low recording rate is prohibited.

12. The video signal converting apparatus according to claim 1, further comprising a screen generating unit that generates a selection screen used to select a recording mode set by the recording mode setting unit, wherein
the screen generating unit, when the conversion mode setting unit sets the three-dimensional mode, generates a selection screen added with information that recommends a recording mode having a high recording rate of the recording modes that can be set by the recording mode setting unit.

13. The video signal converting apparatus according to claim 1, further comprising a screen generating unit that generates a selection screen used to select a recording mode set by the recording mode setting unit, wherein
the screen generating unit, when the conversion mode setting unit sets the three-dimensional mode, generates a selection screen added with information representing that recording modes that can be set by the recording mode setting unit are limited when the conversion mode setting unit sets the two-dimensional mode.

14. A video signal converting method comprising the steps of:
setting a conversion mode used when a video signal is processed and converted into a recording video signal to any one of a two-dimensional mode that converts the video signal into a two-dimensional recording video signal and a three-dimensional mode that converts the video signal into a three-dimensional recording video signal;
setting at least one recording mode that can be used when the video signal is converted in each of the two-dimensional mode and the three-dimensional mode, each of the recording modes specifying a recording rate;
processing the video signal based on the set conversion mode and the set recording mode to convert the video signal into the a recording video signal; and
when the recording mode is set, setting a recording mode such that a combination of recording modes that can be set when the two-dimensional mode is set is different from a combination of recording modes that can be set when the three-dimensional mode is set.

* * * * *